US012445768B2

(12) United States Patent
Ali et al.

(10) Patent No.: US 12,445,768 B2
(45) Date of Patent: Oct. 14, 2025

(54) SYSTEM AND METHOD FOR DYNAMIC BEAM-STEERING CONTROL FOR CONSTANT BEAMWIDTH TRANSDUCER ARRAYS

(71) Applicant: HARMAN INTERNATIONAL INDUSTRIES, INCORPORATED, Stamford, CT (US)

(72) Inventors: Hussnain Ali, Frisco, TX (US); James Bunning, Sherman Oaks, CA (US)

(73) Assignee: Harman International Industries, Incorporated, Stamford, CT (US)

( * ) Notice: Subject to any disclaimer, the term of this patent is extended or adjusted under 35 U.S.C. 154(b) by 242 days.

(21) Appl. No.: 18/030,938

(22) PCT Filed: Oct. 9, 2020

(86) PCT No.: PCT/US2020/054968

§ 371 (c)(1),
(2) Date: Apr. 7, 2023

(87) PCT Pub. No.: WO2022/075999

PCT Pub. Date: Apr. 14, 2022

(65) Prior Publication Data

US 2023/0421949 A1 Dec. 28, 2023

(51) Int. Cl.
*H04R 1/40* (2006.01)

(52) U.S. Cl.
CPC ....... *H04R 1/403* (2013.01); *H04R 2201/401* (2013.01)

(58) Field of Classification Search
CPC ...... H04R 1/403; H04R 3/12; H04R 2430/20; H04R 1/32; H04R 1/323; H04R 1/40
See application file for complete search history.

(56) References Cited

U.S. PATENT DOCUMENTS

| | | | |
|---|---|---|---|
| 7,684,574 B2 | 3/2010 | Keele, Jr. et al. |
| 7,826,622 B2 | 11/2010 | Keele, Jr. |
| 8,170,223 B2 | 5/2012 | Keele, Jr. |
| 9,414,152 B2 | 8/2016 | Fincham |

(Continued)

OTHER PUBLICATIONS

International Search Report dated Sep. 3, 2021 for PCT Appn. No. PCT/US2020/054961 filed Oct. 9, 2020, 27 pgs.

(Continued)

*Primary Examiner* — Kile O Blair
(74) *Attorney, Agent, or Firm* — Brooks Kushman, P.C.

(57) ABSTRACT

In at least one embodiment, a system for controlling a multi-beam constant beamwidth transducer (CBT) array is provided. The system includes a loudspeaker assembly and at least one controller. The loudspeaker assembly includes a CBT array of transducers configured to transmit a first sound beam at a first tilt angle into a listening environment. The at least one controller is programmed to receive an input indicative of at least one of dimensions of the listening environment, a location of the loudspeaker assembly, and a location of a user in the listening environment. The at least one controller is further programmed to dynamically control the CBT array of transducers to transmit the first sound beam at a second tilt angle that is different than the first tilt angle into the listening environment based on the input.

20 Claims, 30 Drawing Sheets

(56) References Cited

U.S. PATENT DOCUMENTS

| | | | | |
|---|---|---|---|---|
| 2006/0140420 | A1 * | 6/2006 | Machida | H04H 60/65 381/387 |
| 2008/0212805 | A1 | 9/2008 | Fincham | |
| 2016/0021481 | A1 * | 1/2016 | Johnson | H04R 5/04 381/303 |

OTHER PUBLICATIONS

International Search Report dated Jun. 29, 2021 for PCT Appn. No. PCT/US2020/054968 filed Oct. 9, 2020, 14 ogs.

International Preliminary Report on Patentability dated Apr. 20, 2023 for PCT Appn. No. PCT/US2020/054961 filed Oct. 9, 2020, 20 pgs.

International Preliminary Report on Patentability dated Apr. 20, 2023 for PCT Appn. No. PCT/US2020/054968 filed Oct. 9, 2020, 9 pgs.

Related U.S. Appl. No. 18/030,664, filed Apr. 6, 2023.

European Office Action dated Feb. 24, 2025 for European Application No. 20799937.6 filed Apr. 4, 2023, 5 pgs.

European Office Action dated Mar. 17, 2025 for European Application No. 20800418.4 filed Mar. 24, 2023, 4 pgs.

* cited by examiner

| | |
|---|---|
| Beam # | 2 |
| Beam Width | 30⁰ |
| Tilt Angle | +45⁰ |
| Delay-Derived Arc |  |

| | |
|---|---|
| Beam # | 2 |
| Beam Width | 30⁰ |
| Tilt Angle | +45⁰ |
| Delay-derived tilt |  |

| Beam # | 3 |
|---|---|
| Beam Width | 30° |
| Tilt Angle | -45° |
| Delay-Derived Arc |  |

| Beam # | 3 |
|---|---|
| Beam Width | 30° |
| Tilt Angle | -45° |
| Delay-derived tilt |  |

| Beam # | 3 |
| --- | --- |
| Beam Width | 30° |
| Tilt Angle | -45° |
| Polar Response at 10 Different Frequencies (2kHz-10kHz) with 1/3 Octave Spacing | Sum Time Delays |
| | Apply Amplitude Shading |

Beam Angle too broad
Overhead sound doesn't reach listener ears

Beam Angle too sharp
Overhead sound doesn't reach listener ears

SYSTEM AND METHOD FOR DYNAMIC BEAM-STEERING CONTROL FOR CONSTANT BEAMWIDTH TRANSDUCER ARRAYS

CROSS-REFERENCE TO RELATED APPLICATIONS

This application is the U.S. National Phase of PCT/US2020/054968 filed Oct. 9, 2020, the disclosure of which is hereby incorporated in its entirety by reference herein. This application may relate to International Application Ser. No. PCT/US2020/054961, entitled "SYSTEM AND METHOD FOR MULTI-BEAM CONSTANT BEAMWIDTH TRANSDUCER ARRAY", and filed on Oct. 9, 2020.

TECHNICAL FIELD

Aspects disclosed herein generally provide for, but are not limited to, a system and method for dynamic beam-steering control for constant beamwidth transducer (CBT) arrays. In one aspect, the system and method provide for a control mechanism to dynamically steer and direct sound beams from CBT arrays towards the listening position. The disclosed examples may enable a real-time dynamic adjustment of immersive sound for various locations (e.g., sweet spots) via overhead sound as well as surround sound projection. These aspects and others will be discussed in more detail herein.

BACKGROUND

U.S. Pat. No. 8,170,223 to Keele, Jr. discloses a loudspeaker for receiving an incoming electrical signal and transmitting an acoustical signal that is directional and has a substantially constant beamwidth over a wide frequency range. The loudspeaker may include a curved mounting plate that has curvature over a range of angles. The loudspeaker may include an array of speaker drivers coupled to the mounting plate. Each speaker driver may be driven by an electrical signal having a respective amplitude that is a function of the speaker driver's respective location on the mounting plate. The function may be a Legendre function. Alternatively, the loudspeaker may include a flat mounting plate. In this case, the respective electrical signal driving each speaker driver may have a phase delay that virtually positions the loudspeaker onto a curved surface.

SUMMARY

In at least one embodiment, a system for controlling a multi-beam constant beamwidth transducer (CBT) array is provided. The system includes a loudspeaker assembly and at least one controller. The loudspeaker assembly includes a CBT array of transducers configured to transmit a first sound beam at a first tilt angle into a listening environment. The at least one controller is programmed to receive an input indicative of at least one of dimensions of the listening environment, a location of the loudspeaker assembly, and a location of a user in the listening environment. The at least one controller is further programmed to dynamically control the CBT array of transducers to transmit the first sound beam at a second tilt angle that is different than the first tilt angle into the listening environment based on the input.

In at least one embodiment, a system for controlling a multi-beam constant beamwidth transducer (CBT) array is provided. The system includes a loudspeaker assembly and at least one controller. The loudspeaker assembly includes a CBT array of transducers configured to transmit a first sound beam at a first beamwidth into a listening environment. The at least one controller is programmed to receive an input indicative of at least one of dimensions of the listening environment, a location of the loudspeaker assembly, and a location of at least one user in the listening environment. The at least one controller is further programmed to dynamically control the CBT array of transducers to transmit the first sound beam with a second beamwidth that is different than the first beamwidth into the listening environment based on the input.

In at least one embodiment, a method for controlling a multi-beam constant beamwidth transducer (CBT) array is provided. The method includes receiving an input indicative of at least one of dimensions of listening environment, a location of a loudspeaker assembly, and a location of at least one user in the listening environment. The loudspeaker assembly includes a constant beamwidth transducer (CBT) array of transducers that transmits a first sound beam at a first tilt angle and at a first beamwidth into a listening environment. The method further includes dynamically controlling the CBT array of transducers to transmit the first sound beam at a second tilt angle that is different than the first tilt angle and at a second width that is one of the same as or different than the first beamwidth into the listening environment based on the input.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompanying drawings in which:

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

It is recognized that the controllers as disclosed herein may include various microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof), and software which co-act with one another to perform operation(s) disclosed herein. In addition, such controllers as disclosed utilize one or more microprocessors to execute a computer-program product that is embodied in a non-transitory computer readable medium that is programmed to perform any number of the functions as disclosed. Further, the controller(s) as provided herein includes a housing and the various number of microprocessors, integrated circuits, and memory devices (e.g., FLASH, random access memory (RAM), read only memory (ROM), electrically programmable read only memory (EPROM), electrically erasable programmable read only memory (EEPROM)) positioned within the housing. The controller(s) as disclosed also includes hardware-based inputs and outputs for receiving and transmitting data, respectively from and to other hardware-based devices as discussed herein.

Multi-Beam Constant Beamwidth Transducer Array

Figure 1:
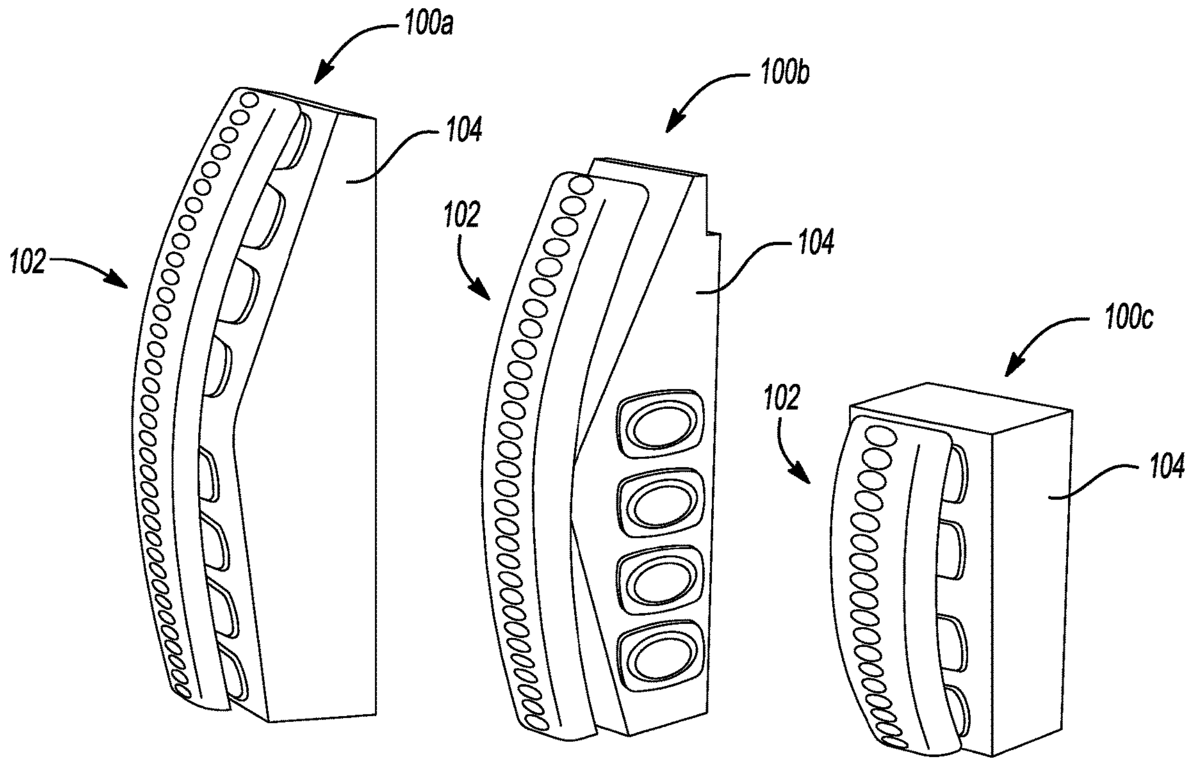
FIG. 1 generally depicts various examples of constant beamwidth transducer (CBT) arrays.
Figure 2:
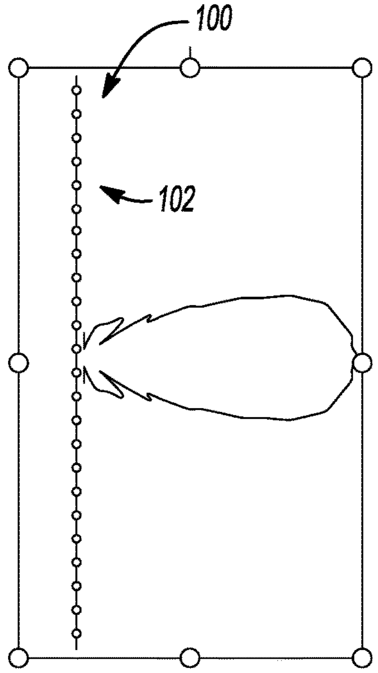
FIG. 2 generally depicts a sound beam as transmitted from a single-beam CBT array.
Figure 3:
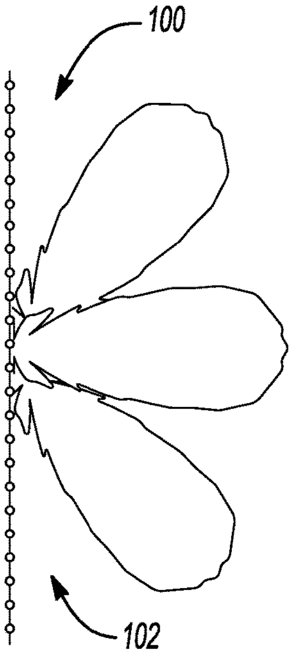
FIG. 3 generally depicts a plurality of sound beams as transmitted from a steered, multi-beam CBT array.

FIG. 1 generally depicts various examples of constant beamwidth transducer (CBT) arrays 100*a*, 100*b*, 100*c* (or "100"). In general, each of the arrays 100*a*, 100*b*, 100*c* includes a plurality of transducers 102 that are placed around a circular arc within a loudspeaker enclosure 104. In one example, the CBT array 100 may be a physically or virtually curved loudspeaker array that forms a single controlled sound beam that is pointed on-axis (e.g., see FIG. 2). The CBT army 100 may be steerable and may generate multiple controlled sound beams from a single array that may be directed off-axis as depicted in FIG. 3. In one example, the array 100 of the transducers 102 may generate a single steerable sound beam off-axis or a single sound beam on-axis at any given time. In another example, the array 100 of transducers 102 may simultaneously generate a plurality of consistently shaped sound beams toward any number of locations or targets (e.g., see FIG. 3).

Figure 4:
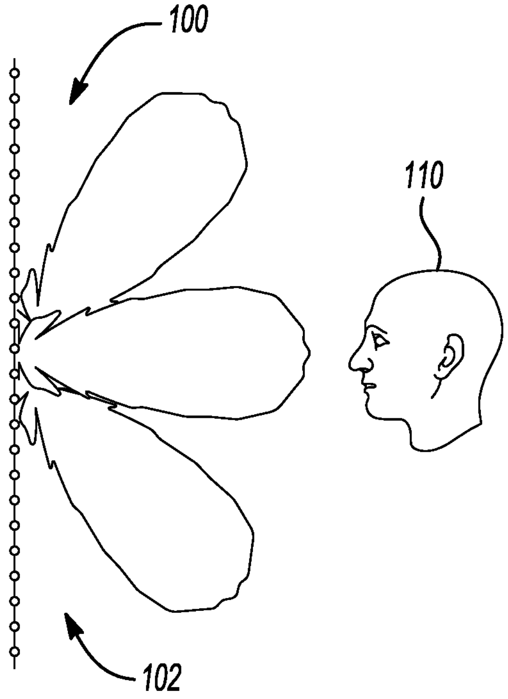
FIG. 4 generally depicts a vertically orientated multi-beam CBT array that is used to create an immersive audio experience.
Figure 5:
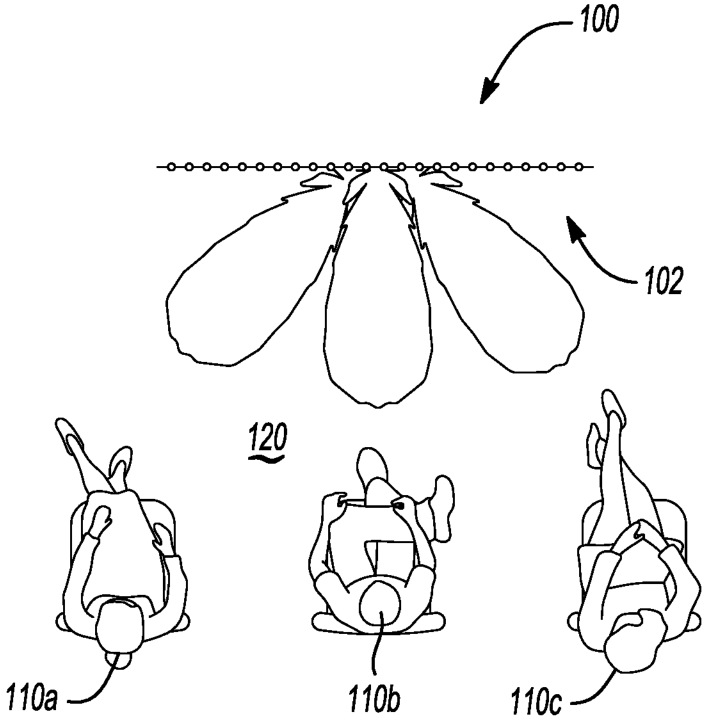
FIG. 5 generally depicts a horizontally orientated soundbar to transmit separate beams for each listener in a listening room.

FIG. 4 generally depicts a vertically orientated multi-beam CBT array 100 that is used to create an immersive audio experience for a listener 110. As shown in FIG. 4, the multi-beam CBT array 100 is formed of a vertically oriented straight-line array that bounces controlled beams off a ceiling in a listening environment for an immersive audio experience. One example of such an embodiment is Dolby Atmos®. FIG. 5 generally depicts a horizontally orientated soundbar (or array 100) that transmits separate beams for each listener 110*a*, 110*b*, 110*c* in a listening room 120. The horizontally oriented soundbar creates individualized beams for each listener 110*a*, 110*b*, 110*c* or emits separate beams for different audio channels, such as middle, left, and right.

It is recognized that CBT based arrays may be separated into two different applications. For example, the CBT array may be a Constant Beamwidth Transducer (CBT) array as noted above (or "CBT1") or a Constant Beamwidth Technology (CBT) array or ("CBT2"). One difference between the CBT1 array and the CBT2 array is that the CBT1 array incorporates time delay and amplitude shading while the CBT2 array utilizes time delay, amplitude shading, and frequency shading. Amplitude shading generally involves reducing the output level of the drivers at every frequency equally. Frequency shading generally involves low pass filtering the drivers such that the amplitude response is different at different frequencies. Time delay essentially changes the time of arrival of the output from the drivers at the listening position.

Figure 6:
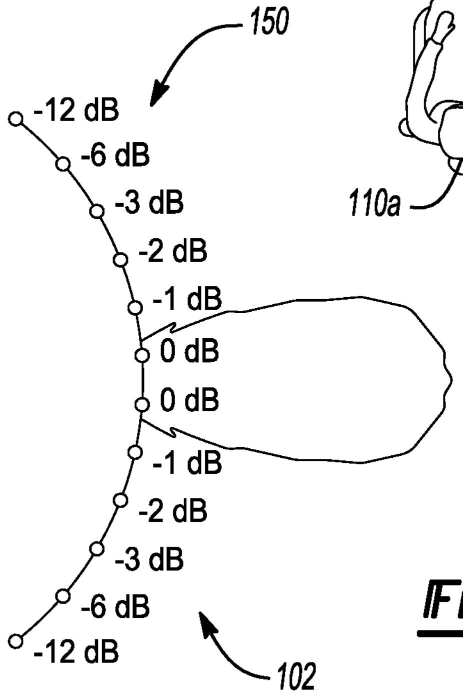
FIG. 6 generally depicts one example of a CBT array with a plurality of drivers.
Figure 7:
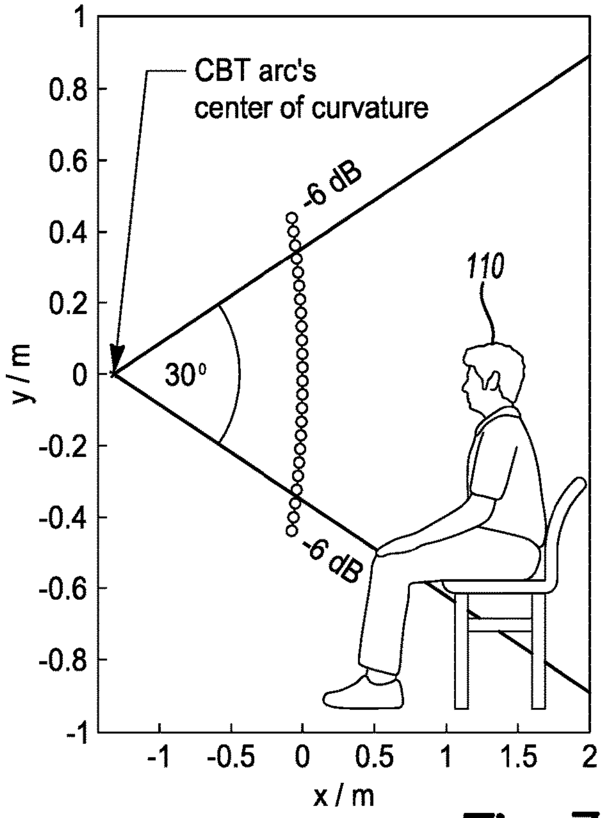
FIG. 7 generally depicts a sound beam transmitted from a CBT array with a predetermined beamwidth angle.
Figure 8:
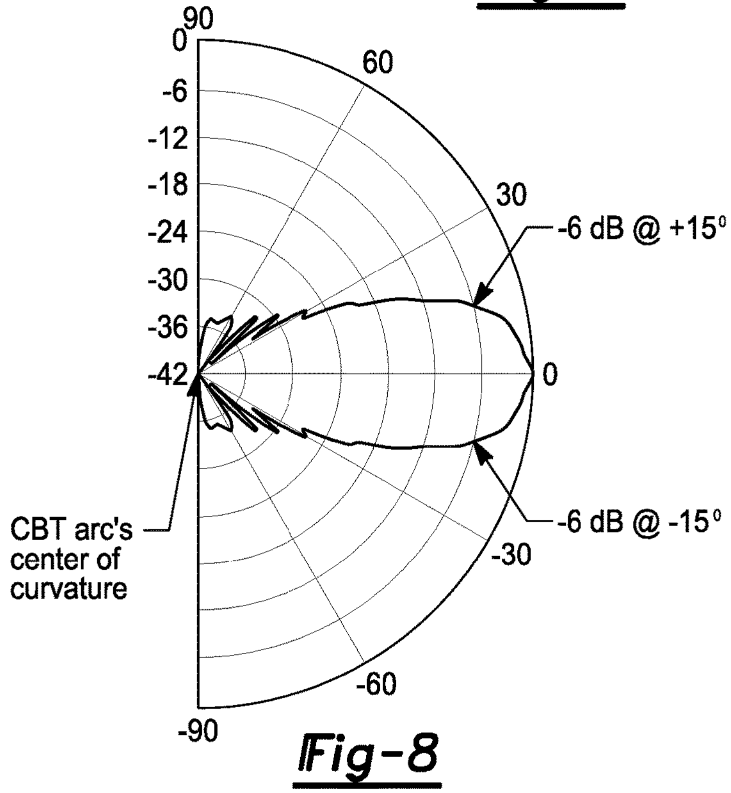
FIG. 8 generally depicts a polar response of a sound beam transmitted from a CBT array with a predetermined beamwidth angle as set forth in FIG. 7.

The CBT1 array is a single-beam CBT array (or loudspeaker array) 150 that is amplitude shaded and curved (either physically, or virtually using time delay) (e.g. see FIG. 1) to produce a fixed-location sound beam that has a constant beamwidth with frequency (e.g., see FIG. 6). The beamwidth may be defined or referred to, for example, as a coverage angle for a sound beam and may be more formally defined as an angle between the −6 dB SPL points of the beam's main lobe (e.g. see FIGS. 7 and 8). FIG. 6 depicts the CBT array 150 with 12 drivers (or transducers) 102 that is physically curved and amplitude shaded. FIG. 7 depicts a sound beam that is emitted from the CBT array 150 with, for example, a 30° beamwidth.

Figure 9:
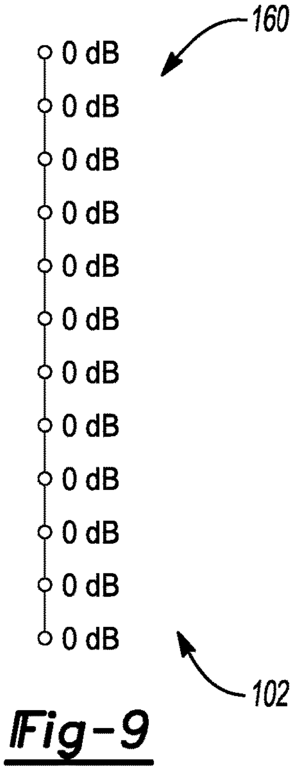
FIG. 9 generally depicts a loudspeaker array formed in a straight line and without amplitude shading (e.g., non-CBT array)
Figure 10:
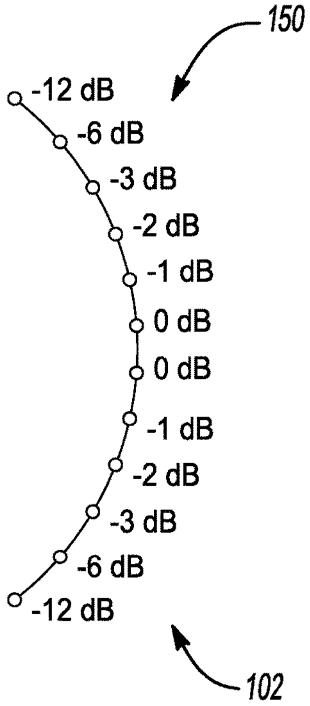
FIG. 10 generally depicts a CBT array formed in a curve and including amplitude shading.

It is desirable to generate a sound beam that has a constant beamwidth over a wide frequency bandwidth since the beam will retain its shape with, for example, different instrument or vocal notes in a music track. By maintaining a constant beamwidth, the CBT array 150 therefore provides a consistent listening experience for each listener 110*a*, 110*b*, 110*c* covered by the beam. To illustrate the manner in which a constant beamwidth facilitates an even and consistent listening experience, beam shapes and coverage patterns of the straight-line based array 160 (see FIG. 9) and the CBT array 150 (see FIG. 10) are provided for reference and discussion. The straight-line array 160 in FIG. 9 is un-curved and does not exhibit any amplitude shading. By contrast, the CBT array 150 in FIG. 10 is curved and amplitude shaded (e.g., see SPL points that range from 0 dB to −12 dB).

Figure 11:
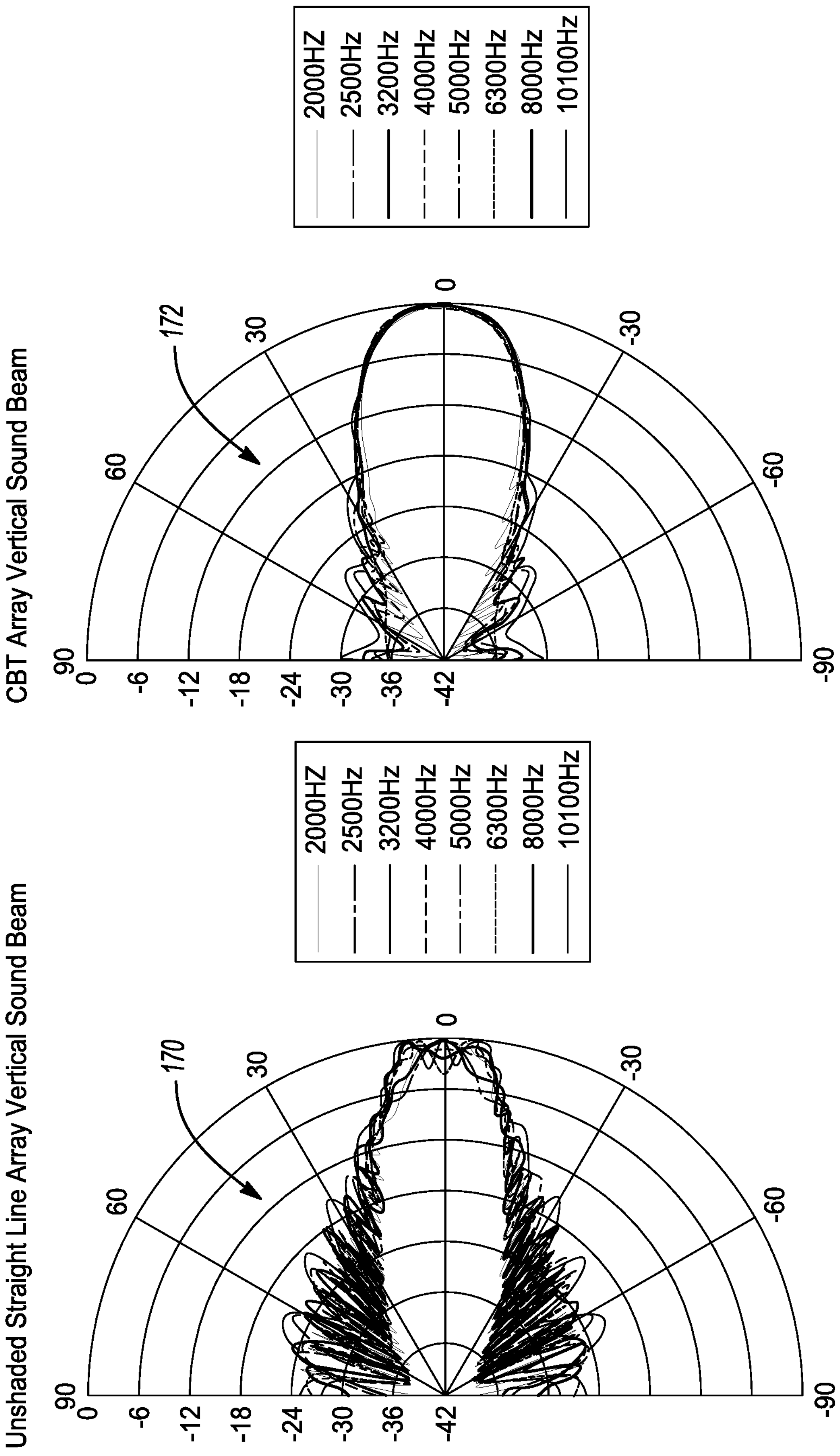
FIG. 11 generally depicts a sound beam from a non-CBT loudspeaker array and a sound beam from a CBT loudspeaker array.
Figure 12A:
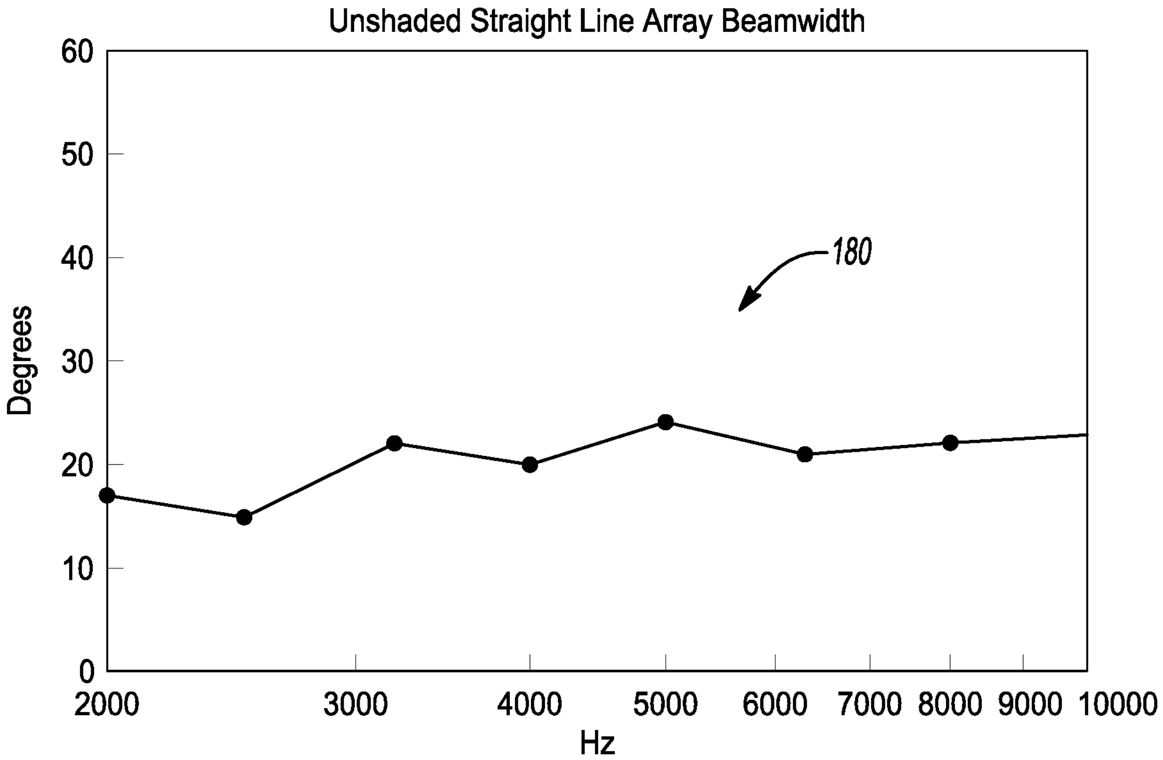
FIGS. 12A-12B generally depict beamwidth vs. frequency plots for a non-CBT loudspeaker array and a CBT loudspeaker array, respectively.
Figure 12B:
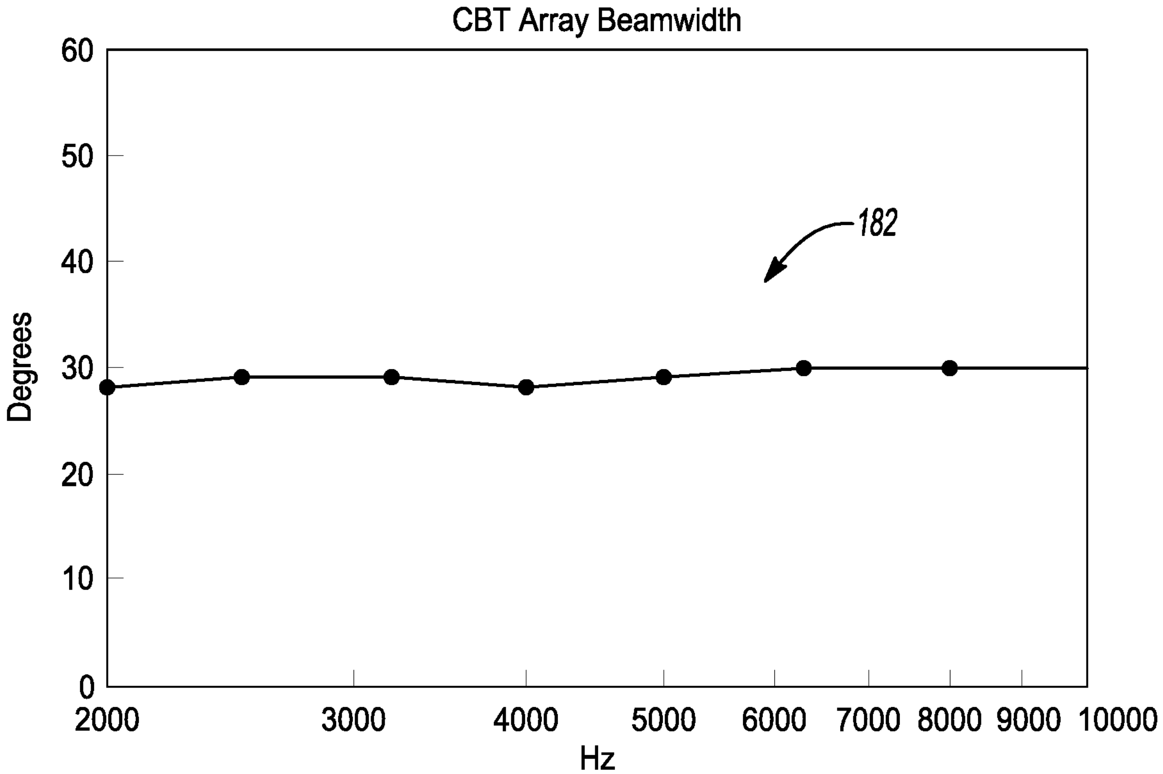

FIG. 11 generally depicts a sound beam 170 from a non-CBT loudspeaker array (e.g., the array 160) and a sound beam 172 from a CBT loudspeaker array (e.g., the array 150). As shown, the sound beam 172 remains constant with frequency while the sound beam 170 exhibits a significant change in shape. FIGS. 12A-12B generally depict beamwidth vs. frequency plots 180 and 182 for the non-CBT loudspeaker array (e.g., the array 160) and the CBT loudspeaker array (e.g., the array 150), respectively. The beamwidth vs. frequency plot 182 for the array 150 is almost flat when compared to the erratic pattern of the beamwidth vs. frequency plot 180 for the array 160.

Figure 13A:
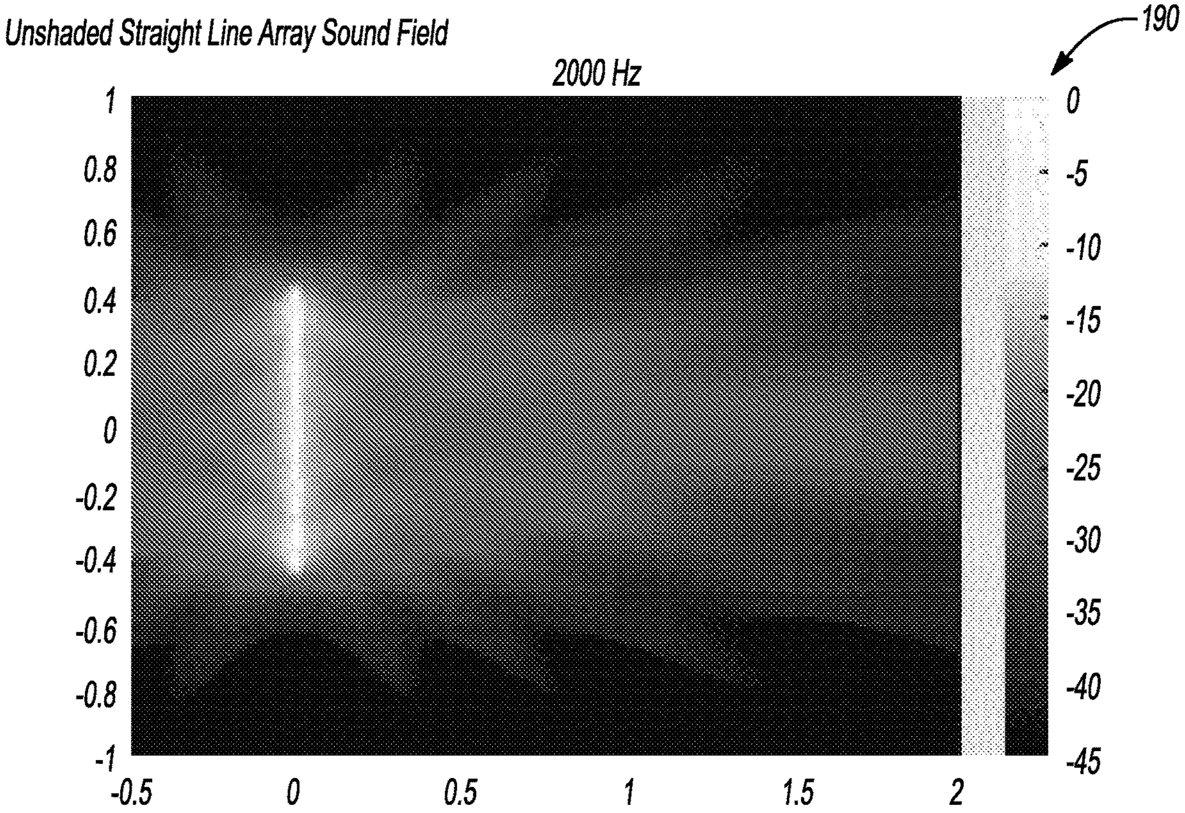
FIGS. 13A-13F generally depict sound field/coverage patterns for a non-CBT array vs. a CBT array.
Figure 13B:
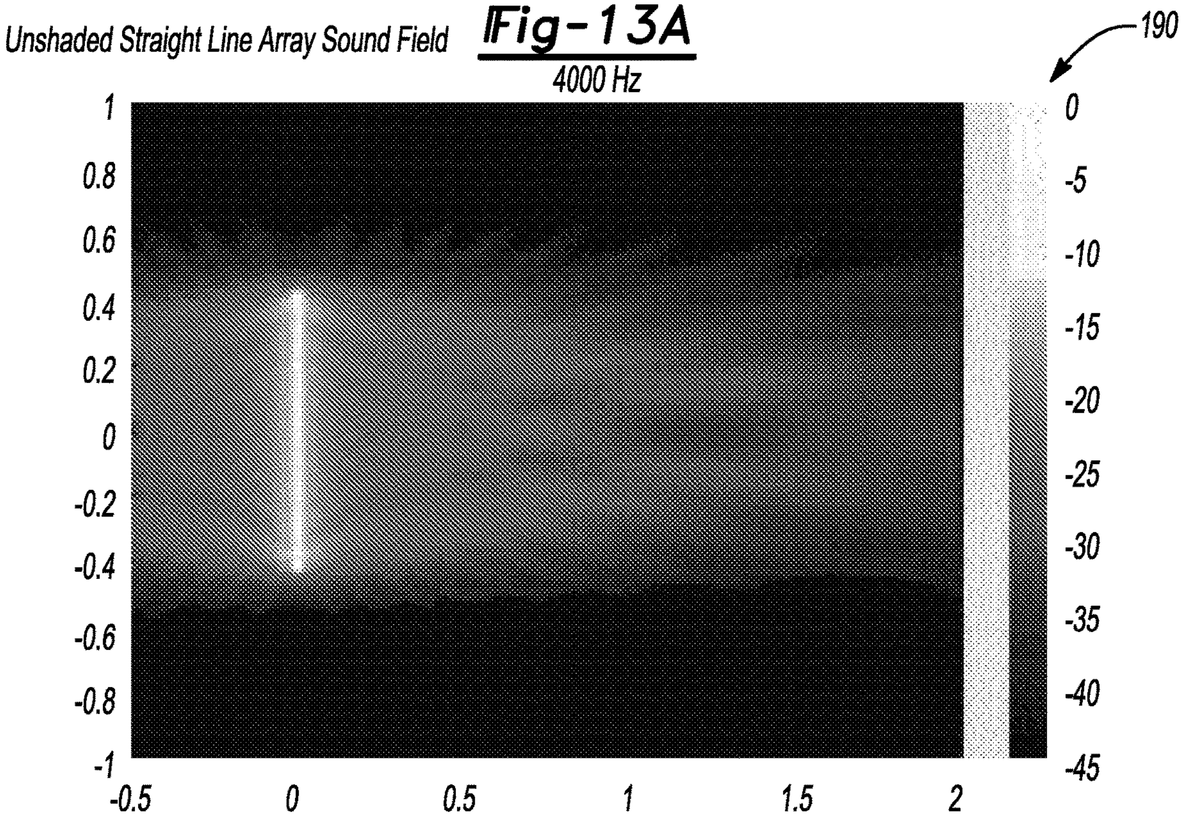
Figure 13C:
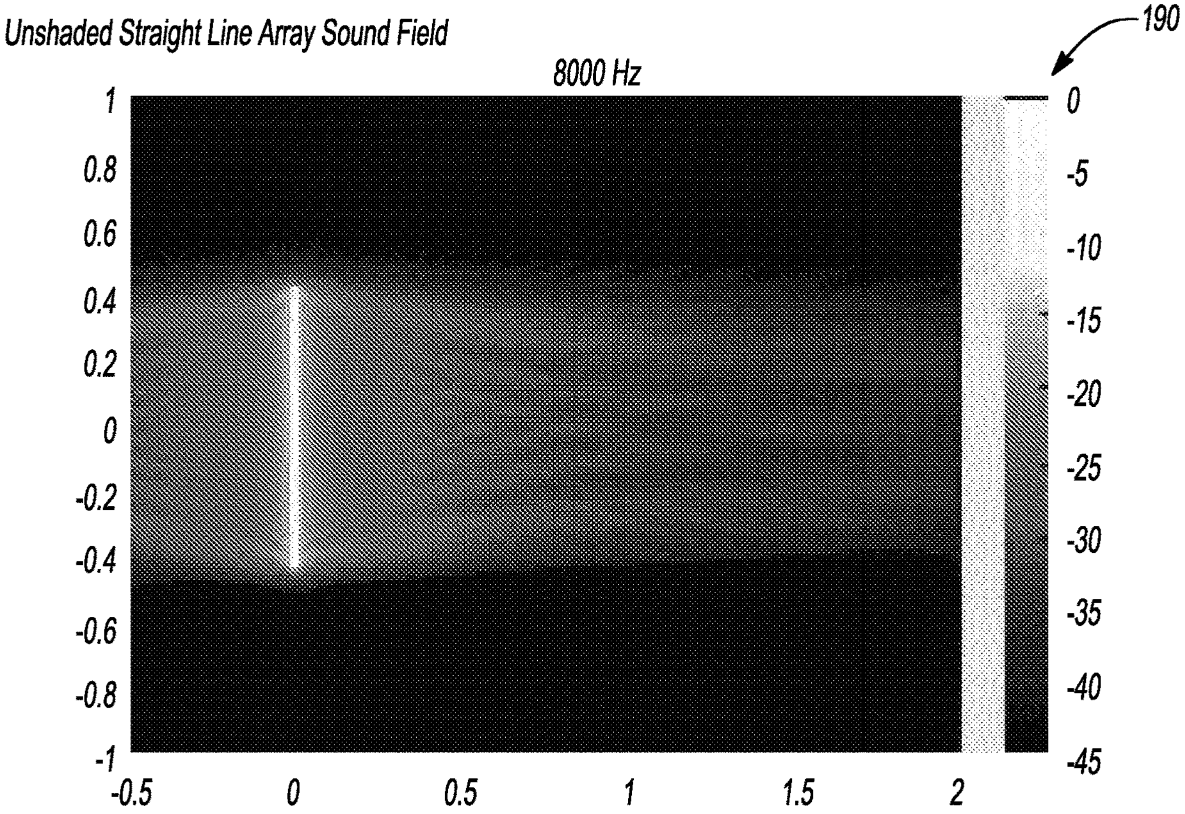
Figure 13D:
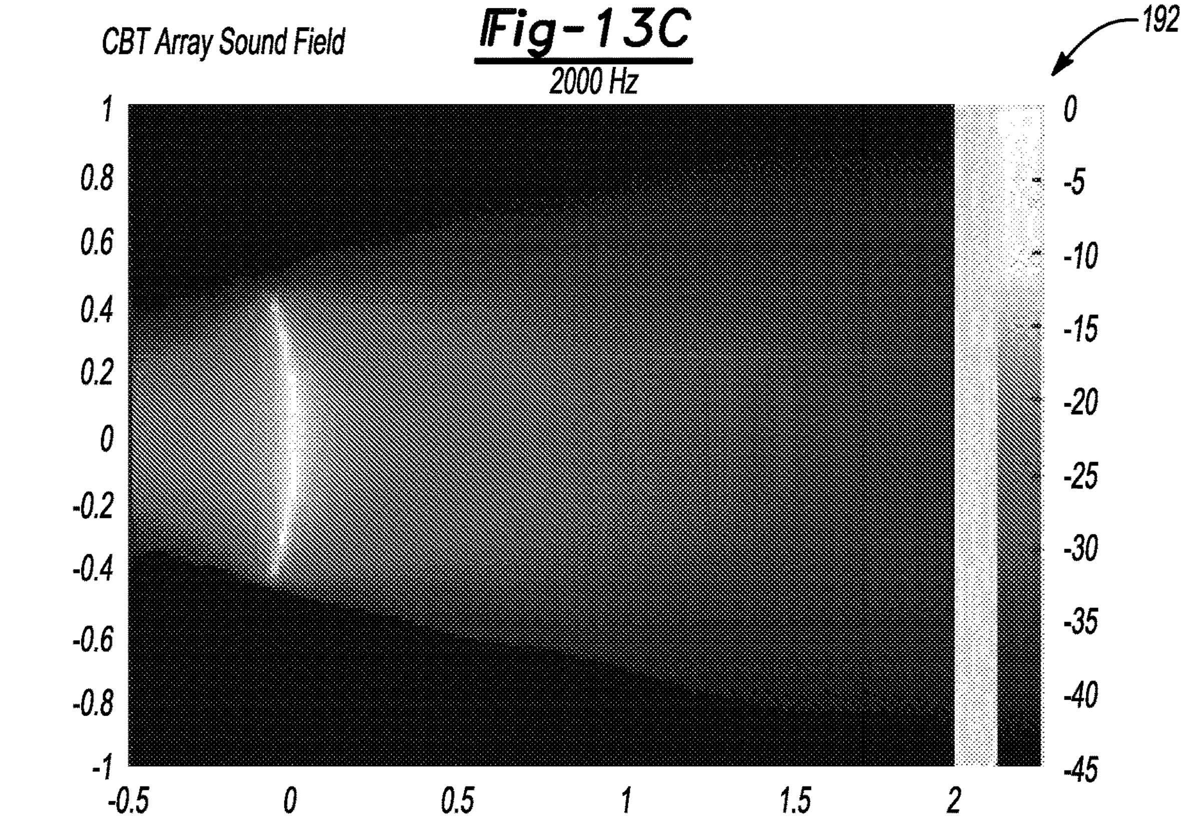
Figure 13E:
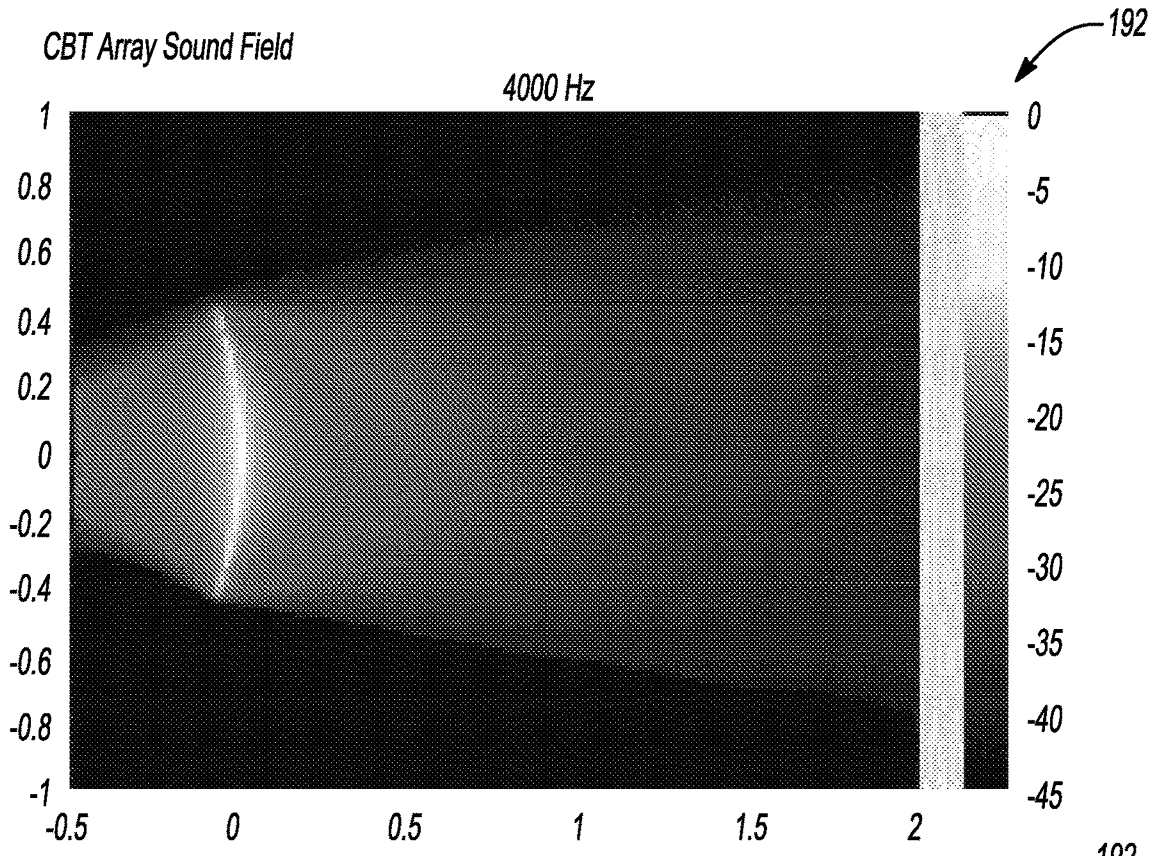
Figure 13F:
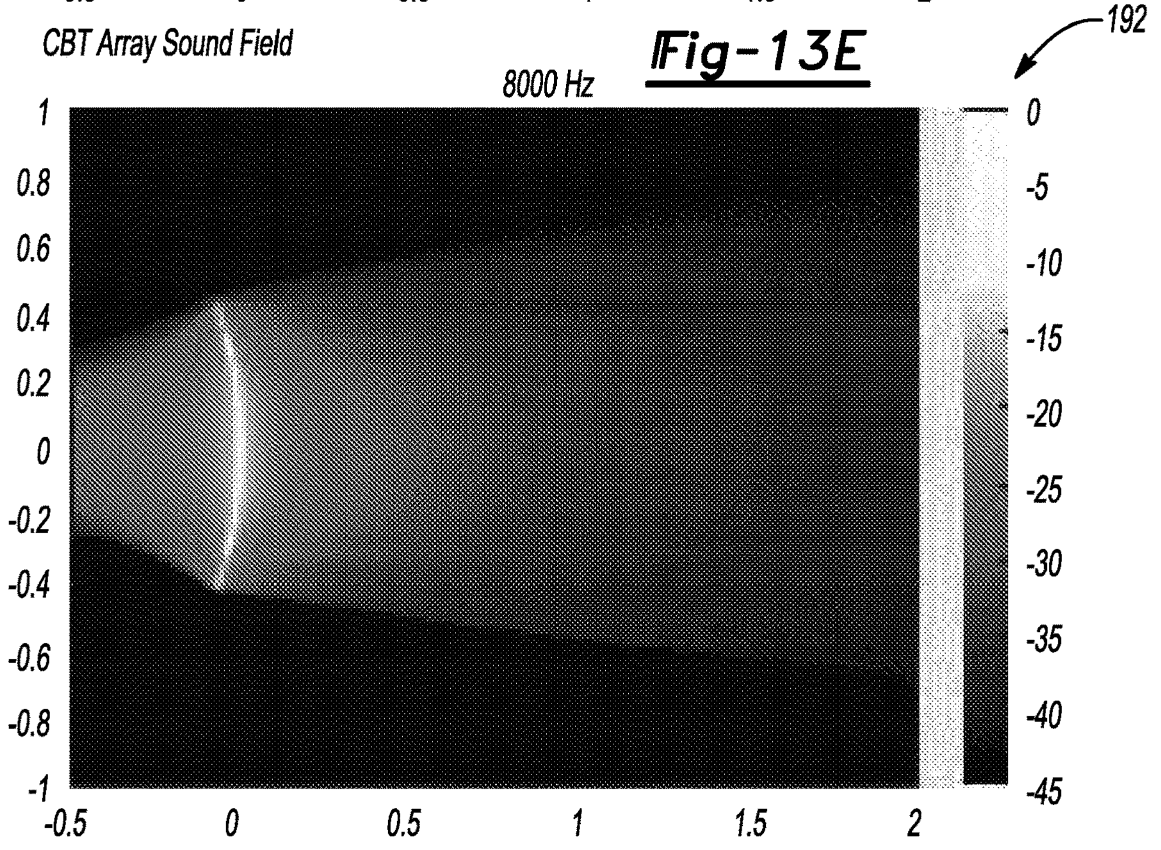

FIGS. 13A-13F generally depict sound field/coverage patterns 190 and 192 for the non-CBT array (e.g., the array 160) (e.g., see FIGS. 13A-13C) and the CBT array (e.g., the array 150) (e.g., see FIGS. 13D-13F). The sound field 190 exhibits dramatic pattern shifts depending on the frequency of the audio output whereas the sound field 192 for the CBT array 150 exhibits a consistent coverage pattern.

The CBT array 150 that provides a fixed-location, single sound beam may be formed by the following method:

1) Select driver spacing (e.g., spacing between transducers 102) and array length;
2) Curve the array 150 physically or virtually; and
3) Amplitude-shade the transducers 102 according to a Legendre shading function.

Select the Driver Spacing and Array Length

The driver spacing and array length may be determined by utilizing the upper and lower frequency limits of beamwidth control. In particular, the CBT array's beamwidth will be constant for frequencies with wavelengths smaller than the length of the array but larger than the driver spacing. For example, the CBT array 150 with 50 drivers that are spaced 17 mm apart may provide constant beamwidth between 417 Hz and 20, 200 Hz, as detailed by the following calculations:

$$f_{lower} = \frac{\text{speed of sound}}{\text{length of array}} = \frac{343\ \text{m/s}}{0.833\ \text{m}} = 417\ \text{Hz}$$

$$f_{upper} = \frac{\text{speed of sound}}{\text{driver spacing}} = \frac{343\ \text{m/s}}{0.017\ \text{m}} = 20{,}200\ \text{Hz}$$

While the upper frequency limit for beamwidth control occurs when the driver spacing is equal to one wavelength, sidelobes may start to form when the driver spacing is greater than a half wavelength. Therefore, even though the array 150 with the transducers 102 (or drivers) may be spaced 17 mm apart, the array 150 may provide a constant beamwidth up to 20,200 Hz with sidelobes beginning to form at 10,100 Hz.

Curve the Array

Figure 14:
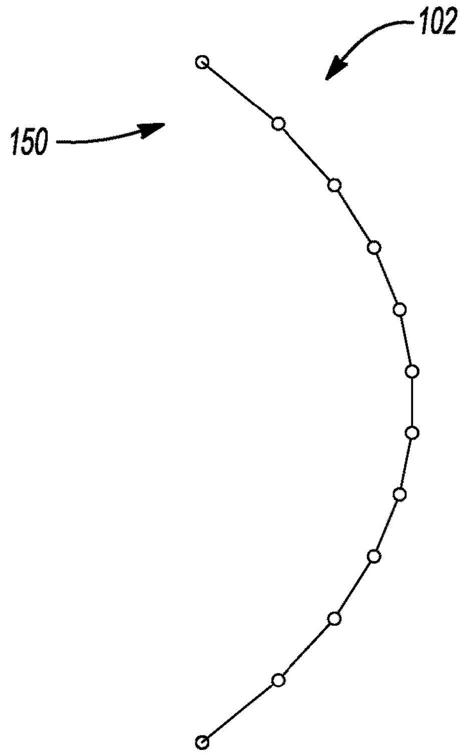
FIG. 14 generally depicts a physically-arced CBT array.
Figure 15:
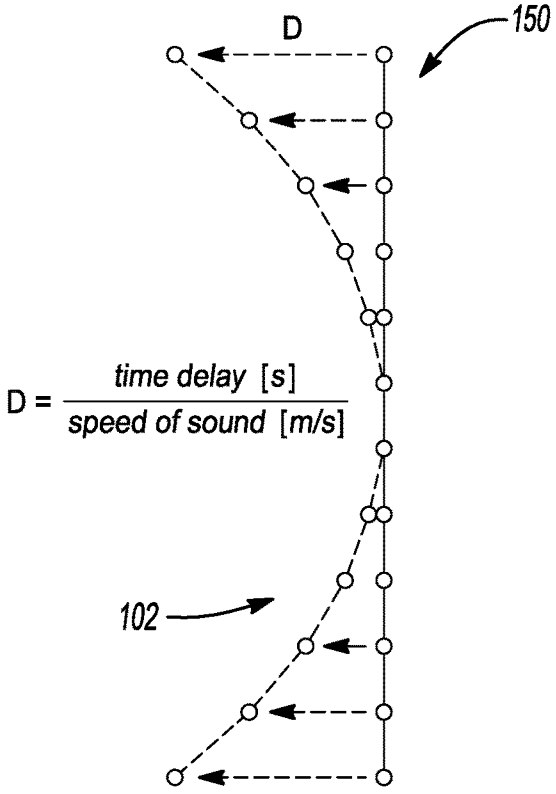
FIG. 15 generally depicts a delay-derived CBT array.
Figure 16:
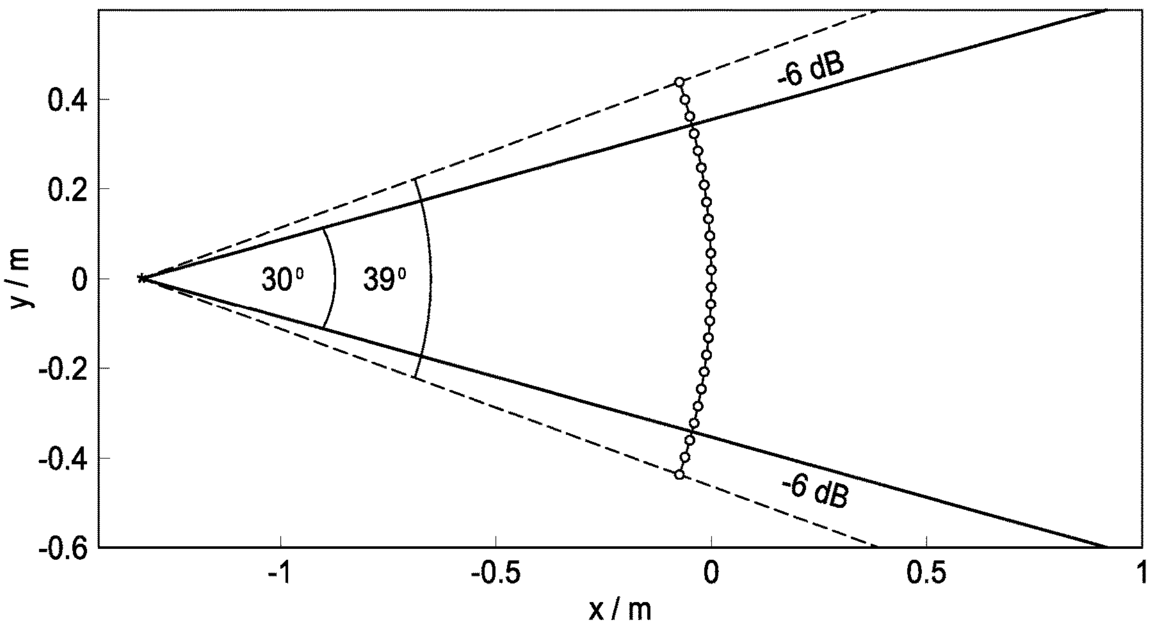
FIG. 16 generally depicts an arc angle of a physically or virtually curved CBT array to create a 30° beamwidth sound beam.

Curving the array 150 may be achieved either by physically arranging the drivers 102 along an arc (see FIG. 14 for a physically-arced CBT array), or by using time delay to effectively move a straight line of drivers 102 backwards to form a virtual arc (see FIG. 15 for a delay-derived CBT arc). In general, an angle of the physical or virtual arc determines the beamwidth (i.e. coverage angle) of the sound beam emitting from the CBT array 150. For example, forming a 30° beam requires a physical or virtual arc angle of 39° (see FIG. 16). The ratio of beamwidth to arc angle is determined by the amplitude shading function, which will be described further below.

Using time delay to create a delay-derived arc from a straight-line array provides a more flexible design than constructing a physical arc because a delay-derived arc can virtually form many different arc angles. Having the ability to produce many different arcs means that the delay-derived CBT array may generate numerous beam widths/coverage patterns rather than a single fixed one.

Figure 17:
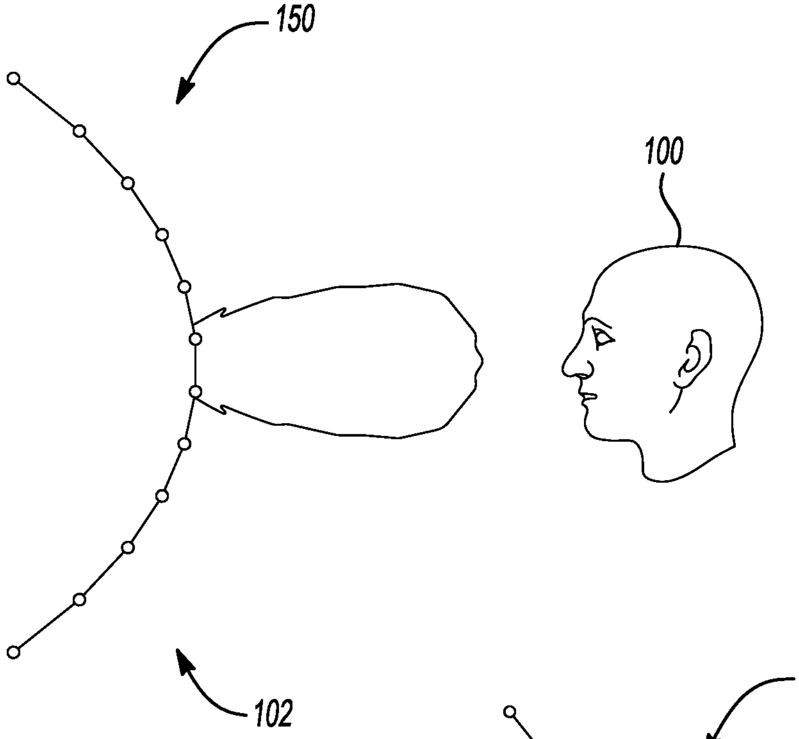
FIG. 17 generally depicts a vertically orientated CBT array.
Figure 18:
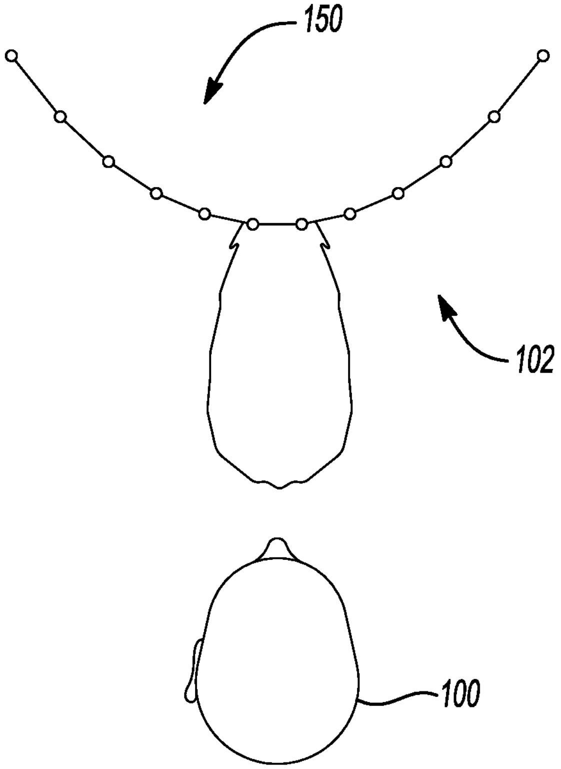
FIG. 18 generally depicts a horizontally oriented CBT array.

The beam originates from the arc's center of curvature, and the beam shape is formed vertically or horizontally depending on the orientation of the array. For example, if the array is orientated vertically, a 30° beam will span 15° up and 15° down (see FIG. 17). Likewise, if the array is orientated horizontally, the same 30° beam will cover 15° right and 15° left (see FIG. 18).

Amplitude-Shade the Drivers (Transducers)

Figure 19:
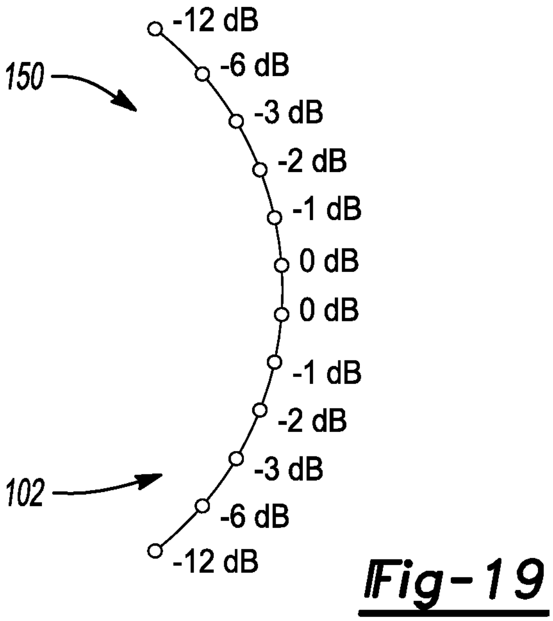
FIG. 19 generally depicts a corresponding amount of amplitude shading applied to each driver of a CBT array.

Amplitude-shading the CBT array 150 generally involves progressively reducing an output level for each pair of transducers 102 from a middle of the array 160 outwards according to a Legendre shading function as illustrated in FIG. 19. FIG. 19 depicts the amount of amplitude shading that is applied to each driver 120. The shading function determines the ratio of the beamwidth to arc angle. Using a Legendre shading function that attenuates the outermost drivers by at most −12 dB creates a beamwidth to arc angle ratio of, for example, 0.7776. Alternatively, the beamwidth of the array 150 is 78% of the physical or virtual arc angle. Thus, producing a beamwidth of 30 requires a 39° physical or virtual arc.

The array 150 may have a beamwidth that is 76% of the arc angle. However, the Legendre shading function that achieves a maximum amplitude shading of −12 dB for the outermost drivers may result in a beamwidth that is 78% of the arc angle.

Figure 20:
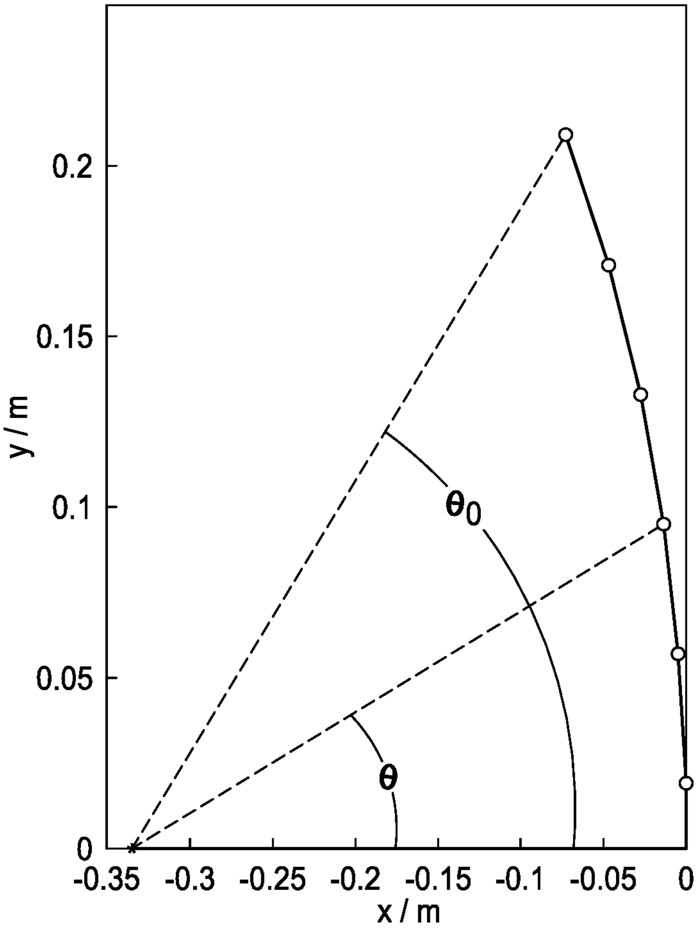
FIG. 20 generally depicts a halved CBT array that illustrates an angular position for each driver of the CBT array.

The amount of amplitude shading for each driver 102 may be calculated in the following way:

1) Divide the array in half (include the middle driver if the array has an odd number of drivers).
2) For each driver, find the normalized angle, $$x = \frac{\theta}{\theta_0},$$

where θ is the angular position of each driver on the arc, and $\theta_0$ is half the arc angle (see FIG. 20). For example, a driver 102 located at the middle point of the array (θ=0°) has a normalized angle x=0. Likewise, the outermost driver ($\theta=\theta_0$) has a normalized angle x=1.

3) Compute the amount of amplitude shading for each driver by passing the normalized angle, $$x = \frac{\theta}{\theta_0},$$

as the argument to the following four-term power series approximation to the CBT Legendre shading function, which is acceptable over all useful Legendre orders:

$$U(x) = \begin{cases} 1 + 0.066x - 1.8x^2 + 0.743x^3 & \text{for } x \le 1 \\ 0 \text{ for } x > 1 \end{cases}$$

Note the above function is exactly 1 at x=0 (driver located at the middle of the array) and 0 at x=1 (outermost drivers).

4) Convert U to decibels. Note that for a driver located at the middle of the array, $$U_{dB}=\log_{10}(1)=\theta\text{dB (no amplitude shading)}$$

and for the outermost drivers, $$U_{dB}=\log_{10}(0)=-\infty\text{dB (complete attenuation)}$$

Figure 21:
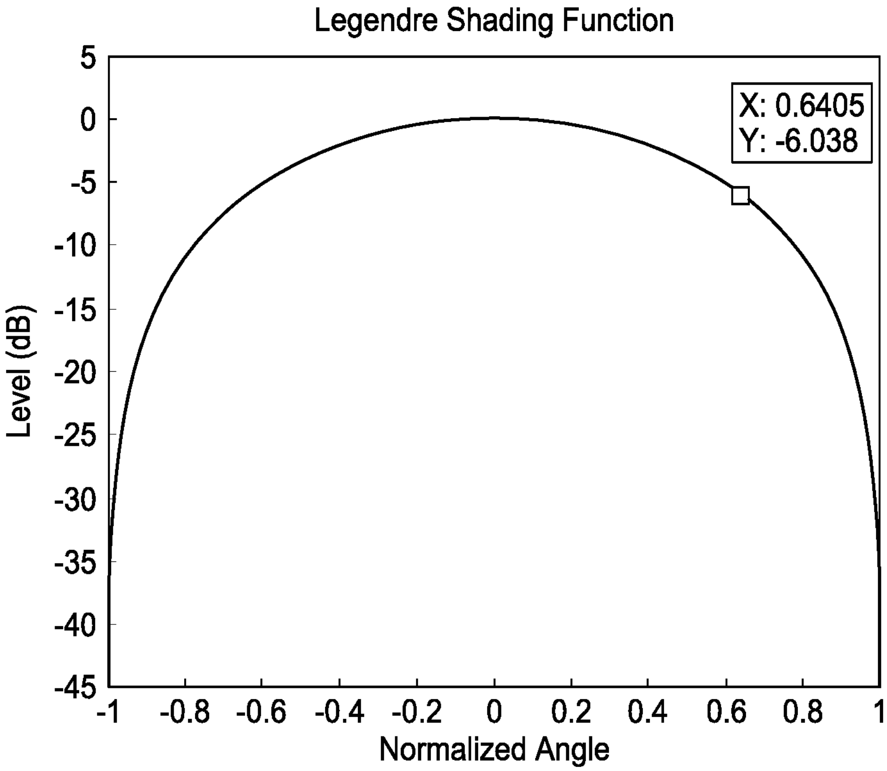
FIG. 21 generally depicts a CBT Legendre shading function curve.
Figure 22:
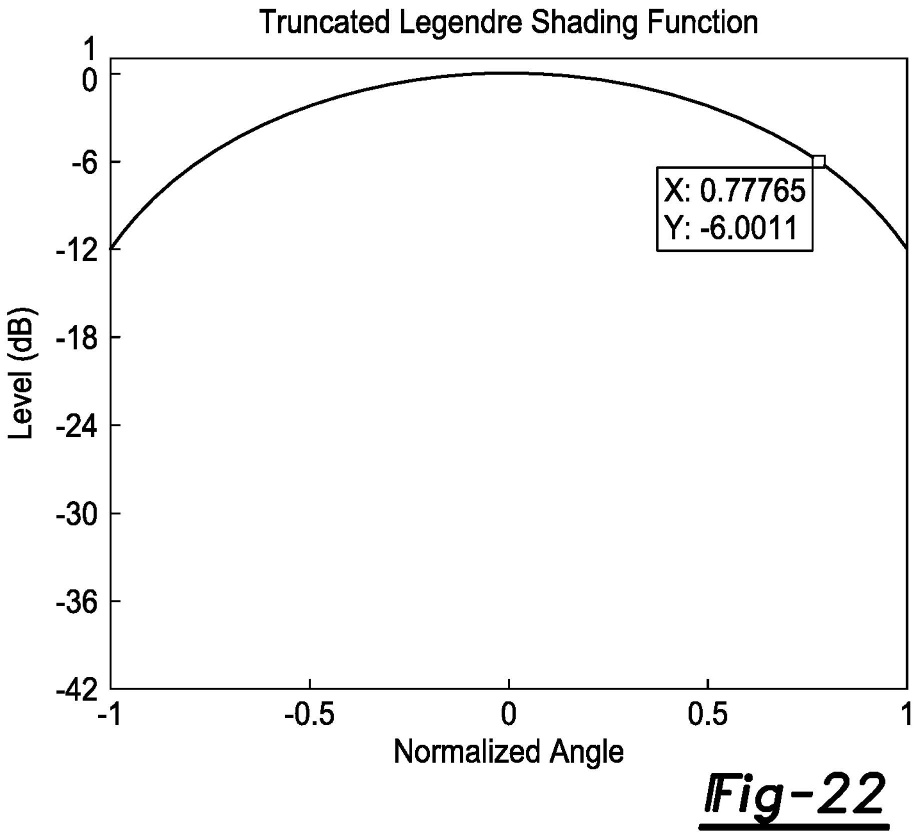
FIG. 22 generally depicts a truncated and expanded CBT Legendre shading function curve.

5) Truncate the Legendre function at −12 dB for the outside drivers and "expand" the curve (see FIGS. 21 and 22).
6) Map the normalized angle on the original Legendre function curve to the normalized angle on the truncated and expanded Legendre function curve to obtain the amount of amplitude shading for each driver 102 in decibels.
7) Apply the shading symmetrically to the bottom half of the array 150.

Figure 23:
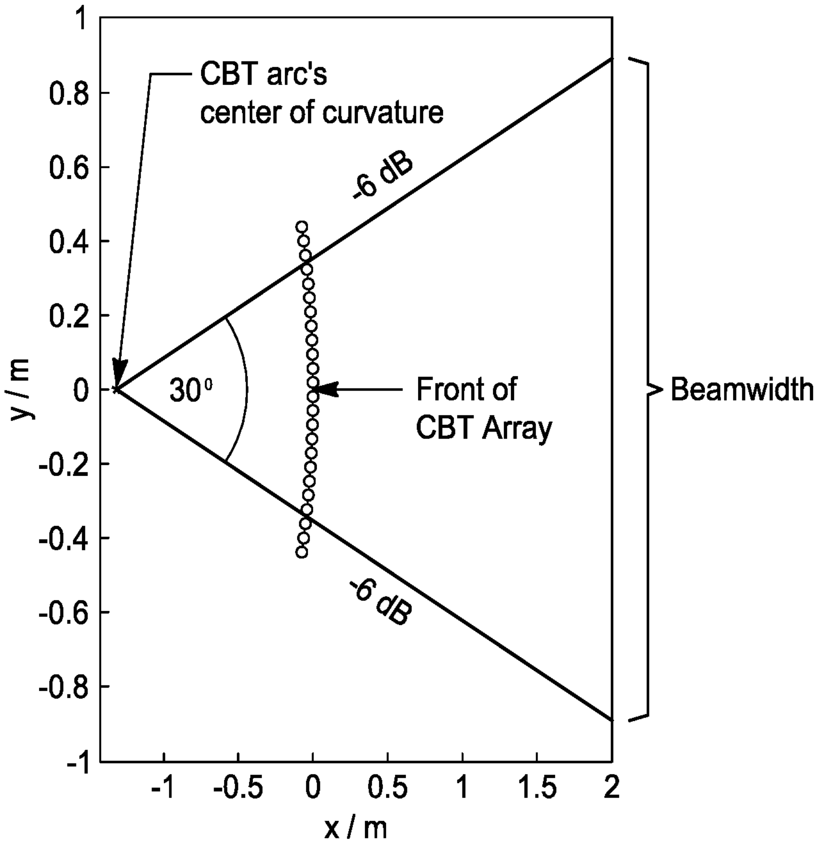
FIG. 23 generally depicts a beamwidth of a CRT array as measured from the center of curvature of an arc.

While the CBT array 150 may provide a constant beamwidth sound beam, the array 150 may have some limitations. For example, the sound beam may only be pointed on-axis. Another drawback is that the array 150 may provide and control only a single sound beam at a time. Yet another constraint is that the beamwidth of the sound beam and polar response need to be measured from the physical or virtual arc's center of curvature rather than the front of the array 150 (see FIG. 23).

Measuring a CBT array 150 from the center of curvature can prove cumbersome because the front of the array 150 must be moved forward from a loudspeaker's typical measurement position in order to rotate the array about the arc's center of curvature. A center of curvature may be well over a meter behind the array, making accurate spin measurements difficult in a typical anechoic chamber.

In addition, defining the center of curvature as the reference point for the beamwidth makes forming the coverage pattern provided by the array 150 tedious in certain instances. Instead of selecting the beamwidth relative to the center of curvature (which is behind the array 150), it may be more desirable to form a target beamwidth relative to the front of the array (which is the reference point for listeners).

Figure 24:
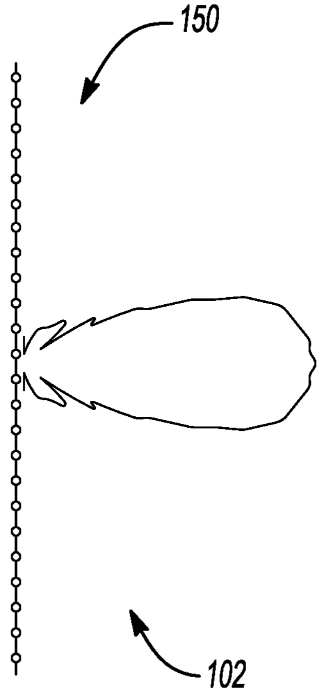
FIG. 24 generally depicts a single-beam CBT array having a single on-axis sound beam generated at a time.
Figure 25:
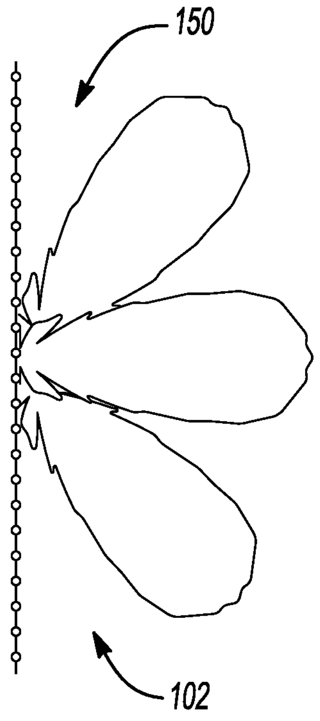
FIG. 25 generally depicts a steered, multi-beam pattern as transmitted from a CBT array.

As noted above, the array 150 may only provide a single on-axis audio beam at a time (see FIG. 24). Embodiments disclosed herein provide multiple steered sound beams at a time, with each beam being pointed on-axis or off-axis (see FIG. 25).

System for Providing a Steerable Multi-Beam Pattern from a CBT Array

Figure 26:
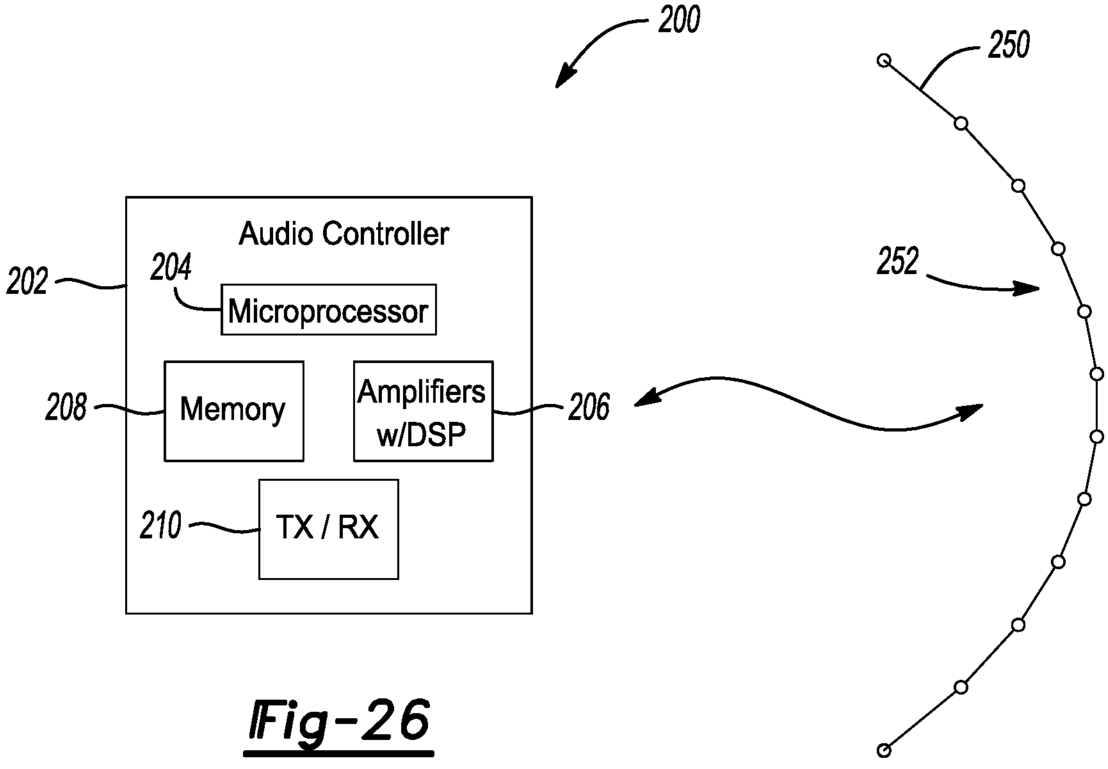
FIG. 26 generally depicts a system for providing a multi-beam pattern from a CBT array in accordance to one embodiment.

FIG. 26 generally depicts a system 200 for providing a steerable multi-beam pattern from a CBT array 250 in accordance to one embodiment. The system 200 includes an audio controller 202 and the CBT array 250. The audio controller 202 includes at least one microprocessor 204 (the microprocessor 204), a plurality of amplifiers 206, memory 208, and a transceiver 210. The audio controller 202 wirelessly transmits an audio input signal to the CBT array 250 via the transceiver 210. In another embodiment, the audio controller 202 and the CBT array 250 may be integrated together as a single component.

The CBT array 250 may include an M×N array of transducers (or drivers) 252. In general, the plurality of amplifiers 206 may include a single amplifier for a corresponding transducer 252. Each of the plurality of amplifiers 206 includes a digital sound processor (DSP) for controlling a time delay and amplitude shading for the transducers 252. This aspect enables the audio controller 202 to adjust a beamwidth of each sound beam generated by the transducers 252 and further to adjust a tilt angle of each sound beam generated by the transducers 252. For example, the audio controller 202 may generate multiple sound beams with each sound beam having a different or similar beamwidth to one another and each having a different or similar tilt angle (or steering angle) to one another.

For purposes of clarification, the audio controller 202 does not adjust the tilt angle for each of the drivers 252 individually. Rather, the audio controller 202 adjusts the tilt angle of each sound beam generated by the transducers 252 collectively.

Method for Forming a Steerable Multi-Beam CBT Array

Figure 27:
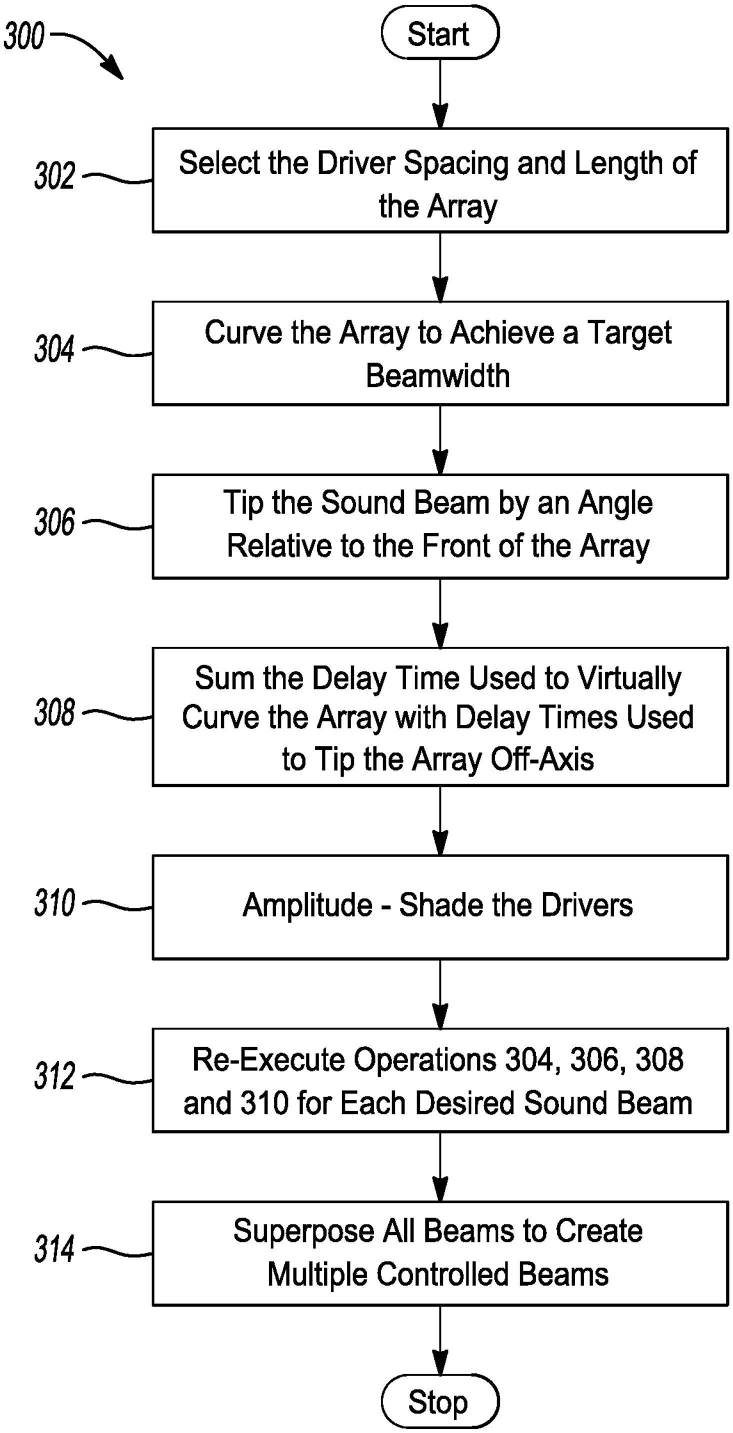
FIG. 27 generally depicts a method for forming a steerable multi-beam CBT array in accordance to one embodiment.

FIG. 27 generally depicts a method 300 for forming the steerable multi-beam CBT array 250 in accordance to one embodiment. The CBT array 250 may provide a steerable and multi-beam pattern by performing the following operations noted below.

In operation 302, the spacing of the drivers 252 and overall length of the array 250 is selected. The spacing of the drivers 252 and the overall length of the array 250 determine the upper and lower frequency limits of beamwidth control provided by the audio controller 202.

Figure 28:
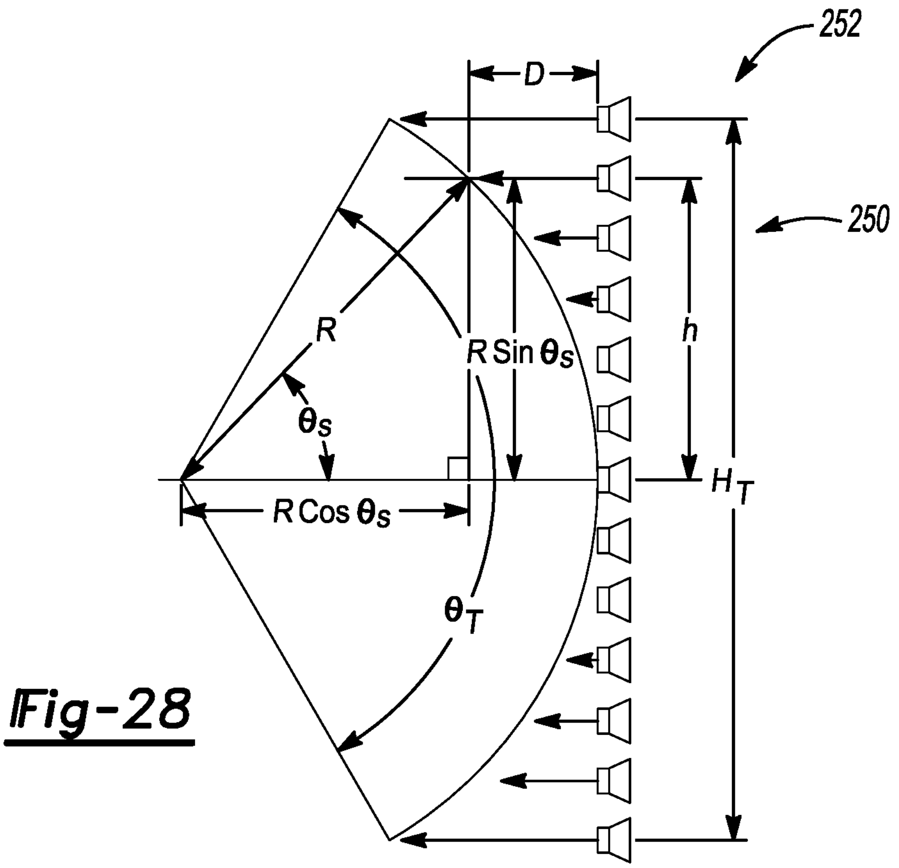
FIG. 28 generally depicts a method for creating a delay-derived arc in accordance to one embodiment, FIG. 29 generally depicts a method for generating a target beamwidth with respect to a front of the CBT array.

In operation 304, the array 250 is curved to achieve the target beamwidth. Curving the array 250 may be achieved by using time delay to effectively move a straight-line of drivers 252 backwards to form a virtual arc in the event the CBT array 250 is formed virtually (and not physically curved). The following set of equations noted directly below and further in reference to FIG. 28 illustrates the manner as to calculate the amount of delay time required for each driver 252, given the arc angle, $\theta_T$, and the height of the straight-line array, $H_T$.

The radius of the CBT arc is given by $$R = \frac{H_T}{2\sin\left(\frac{\theta_T}{2}\right)}$$

where R=radius of arc $H_T$=overall height of arc (assumed to be equal to the height of the straight-line array), and $\theta_T$=included angle of arc.

The angular position of a specific source on the arc is given by $$\theta_s = \sin^{-1}\left(\frac{h}{R}\right)$$

where $\theta_s$=source angle, and h=source height

The required offset D to position the source on the arc is given by $$D=R(1-\cos\theta_s)$$

where D=source offset

Finally, a required delay $\tau_x$ is given by $$\tau_x=D/c$$

where $\tau_x$=offset delay, and c=speed of sound

Figure 29:
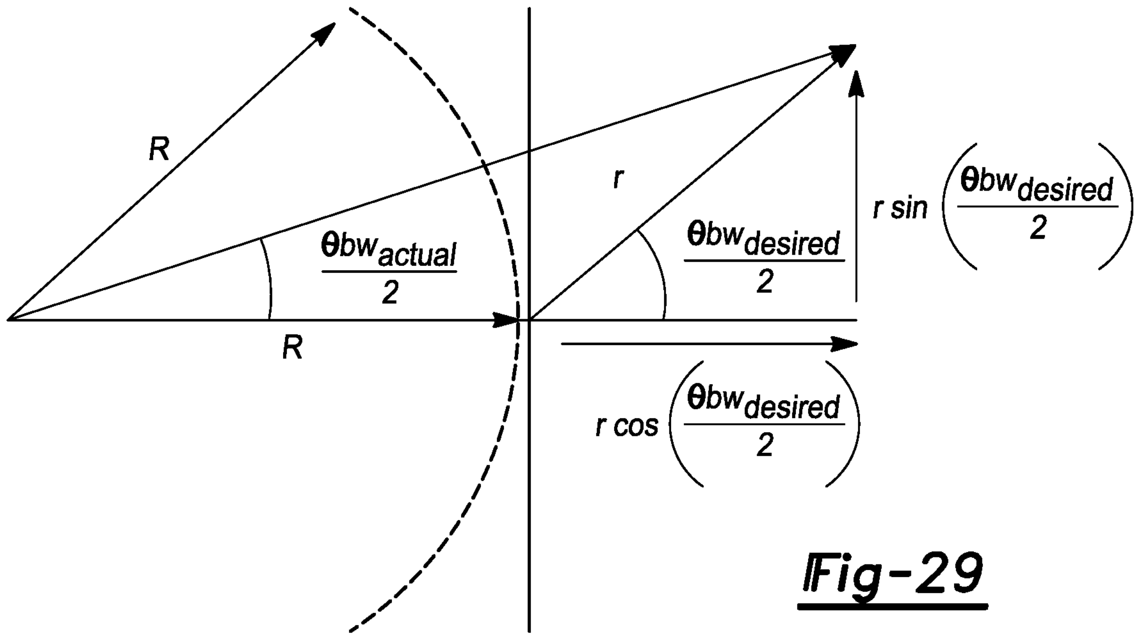

The arc angle, $\theta_T$, is selected to achieve a target beamwidth with respect to the center of curvature (behind the array 250). However, it may be more desirable to design for a target beamwidth with respect to a front of the array 250 since that is the reference point from which users listen to audio. FIG. 29 generally provides geometric relationships needed to calculate an actual beamwidth, $\theta bw_{actual}$, from a target beamwidth, $\theta bw_{desired}$, measured some distance r away from the front of the CBT array 250.

The virtual arc's radius of curvature, R, can be found by solving the following non linear equation:

$$\tan\left(0.7776 * \sin^{-1}\left(\frac{H_t}{2R}\right)\right) * \left(r\cos\left(\frac{\theta bw_{desired}}{2}\right) + R\right) - r\sin\left(\frac{\theta bw_{desired}}{2}\right) = 0$$

By determining the radius of curvature, the actual beamwidth of the array 250 may be found by:

$$\theta bw_{actual} = 2 * \tan^{-1}\left(\frac{r\sin\left(\frac{\theta bw_{desired}}{2}\right)}{r\cos\left(\frac{\theta bw_{desired}}{2}\right) + R)}\right)$$

Thus, the virtual arc's angle may be computed by:

$$\theta_T = \frac{2 * \theta bw_{actual}}{0.7776}$$

In one example, the constant, 0.7776, used in the above equations corresponds to a ratio of the beamwidth to arc angle, which is determined by the Legendre shading function. The controller 202 may perform one or more of the aspects of operation 304 and determine or calculate the time delay (e.g., first time delay) for each driver 252 to virtually curve the CBT array 250 as noted above.

Figure 30:
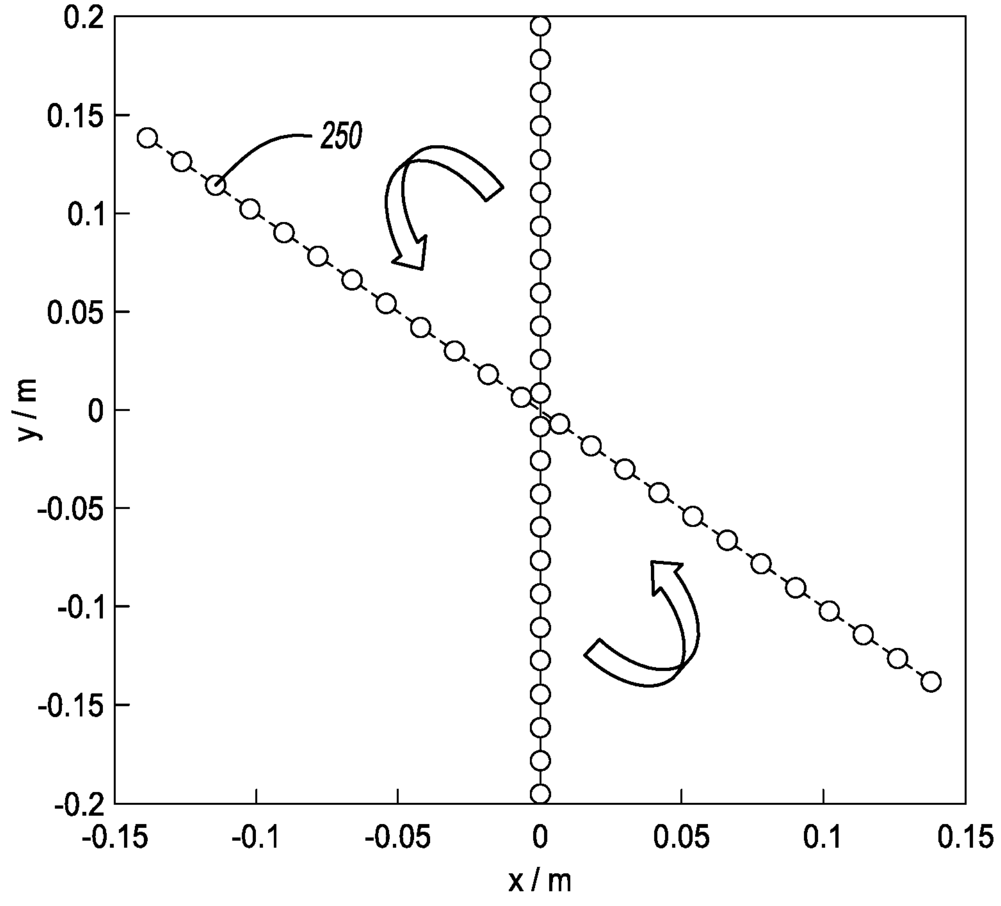
FIG. 30 generally depicts a straight-line loudspeaker array that is rotated in accordance to one embodiment.

In operation 306, the sound beam generated by the array 250 may be tipped. Similar to creating a delay-derived arc from a straight-line array of drivers 252, the steering of the sound beam may be achieved via time manipulation. A straight-line array of drivers 252 may be virtually tipped by progressively time advancing one half of the array's drivers 252 and progressively time delaying the other half. All drivers 252 may then be delayed by the maximum amount of time advancement for the tipping to be realizable with a digital time delay circuit. The method for calculating the amount of time delay required for each driver 252 is described as follows (assuming a vertically oriented array):

1) Multiply the counterclockwise rotation matrix, $$\begin{bmatrix} \cos\theta & -\sin\theta \\ \sin\theta & \cos\theta \end{bmatrix},$$

by the (x, y) coordinate of each driver 252 as follows (see FIG. 30 where the straight line array 250 is rotated 45° counterclockwise) for reference:

$$\begin{bmatrix} \cos\theta & -\sin\theta \\ \sin\theta & \cos\theta \end{bmatrix} * \begin{bmatrix} x \\ y \end{bmatrix},$$

where θ is the desired tipping angle.

Figure 31:
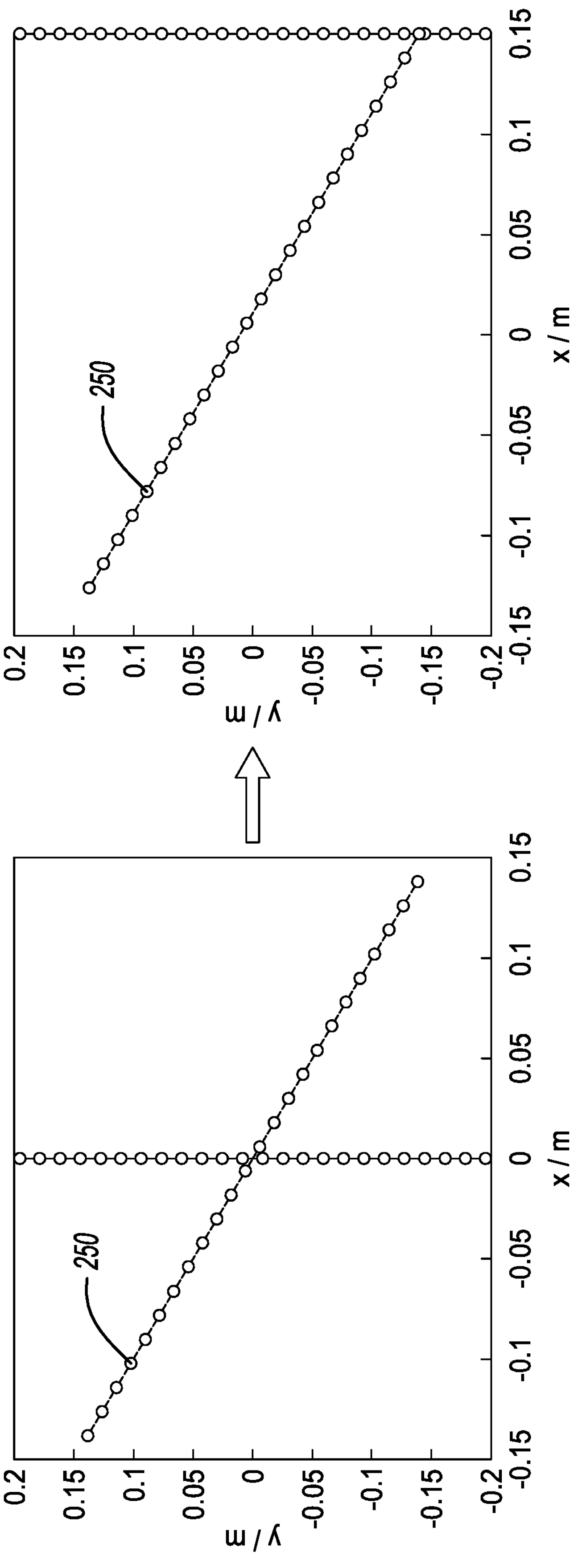
FIG. 31 generally depicts a straight-line array that is rotated and shifted back by a maximum rotated x position in accordance to one embodiment.

2) Subtract the maximum rotated x position from the rotated x position of each driver 252 such that no driver's rotated x position exceeds the x position of the drivers 252 in the straight-line array 250 (see FIG. 31 where the straight-line array 250 is rotated 45° counterclockwise and shifted back by the maximum rotated x position).

3) Calculate the time delay for each driver 252 via the equation below:

$$\tau = \frac{D}{c},$$

where D is the distance to move back each driver 252 from its original x position in the straight-line array 250, and c is the speed of sound. The controller 202 may determine the time delay (e.g., second time delay) for each driver 252 to virtually rotate the CBT array 250 as set forth above with steps 1), (2), and (3) in connection with operation 306.

In operation 308, the curve and tip time delays are summed with one another. For example, the time delay required to position each driver 252 on the delay-derived arc (see operation 304) and the time delay needed to place each driver along the virtually tipped array (see operation 306) may be summed together to determine the total delay required for each driver 252. The total amount of time delay for each driver 252 may be further adjusted such that the driver 252 requiring the least amount of delay has no delay, and the overall delay for all other drivers 252 is thus reduced. The controller 202 may perform one or more aspects of operation 308.

In operation 310, amplitude shading is applied to the drivers 252 (see U(x) as provided above). The output level of each pair of drivers 252 from the middle of the array 250 outwards may be reduced according to a Legendre shading function. The amount of amplitude shading per driver 252 is calculated in the manner noted above. The controller 202 may perform one or more aspects of operation 308.

In operation 312, operations 304, 306, 308, and 310 are re-executed for each desired sound beam. These operations may be repeated to form a plurality of sound beams each having a beamwidth and a corresponding tip angle. FIGS. 32A, 32B, 32C, 32D, 32E, 32F, 32G, and 32H provide a summary of the design process and resulting polar responses for three different 30° vertical beams that are steered at 0°, +45°, and 45°. The simulation results shown in FIGS. 32A-32H are generated for a 50-driver array with 17 mm driver spacing.

Figure 32A:
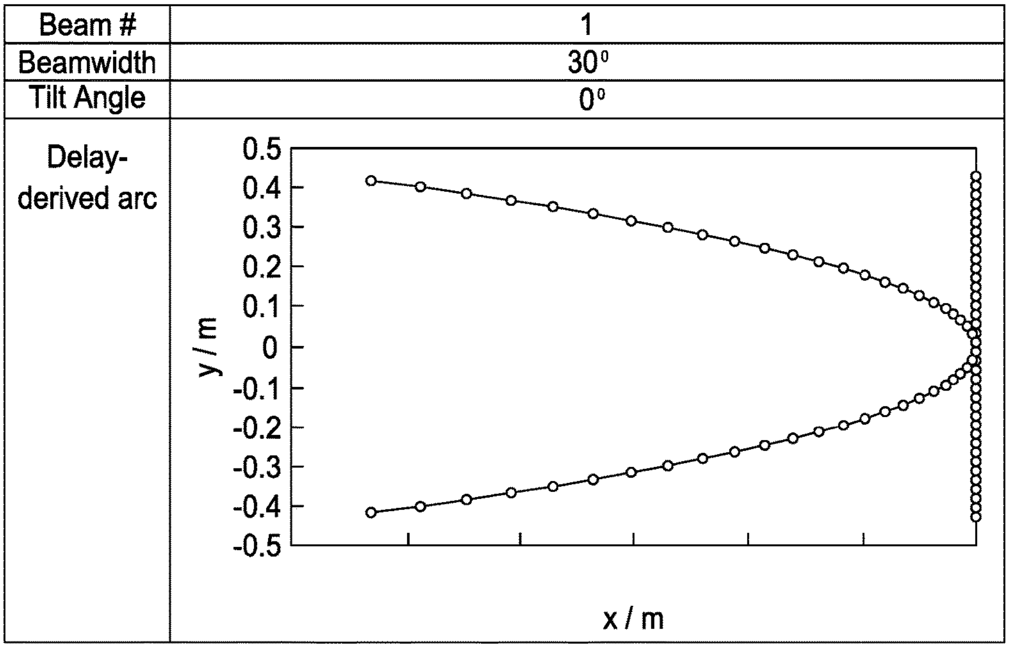
FIGS. 32A-32H generally depict a delay-derived arc, a delay-derived tilt (if applicable), and resulting polar responses for a plurality of audio beams in accordance to one embodiment.
Figure 32B:
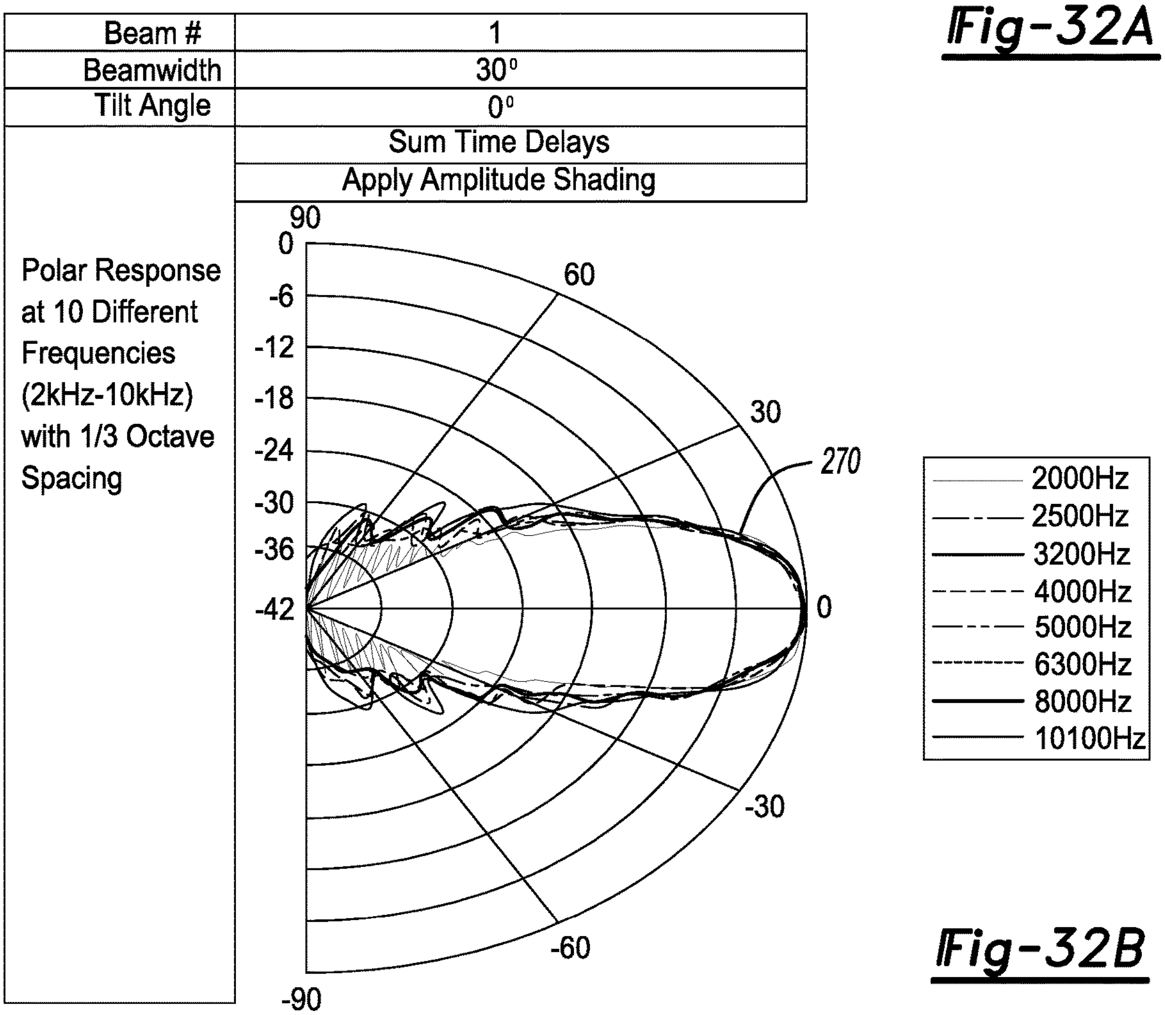
Figure 32C:
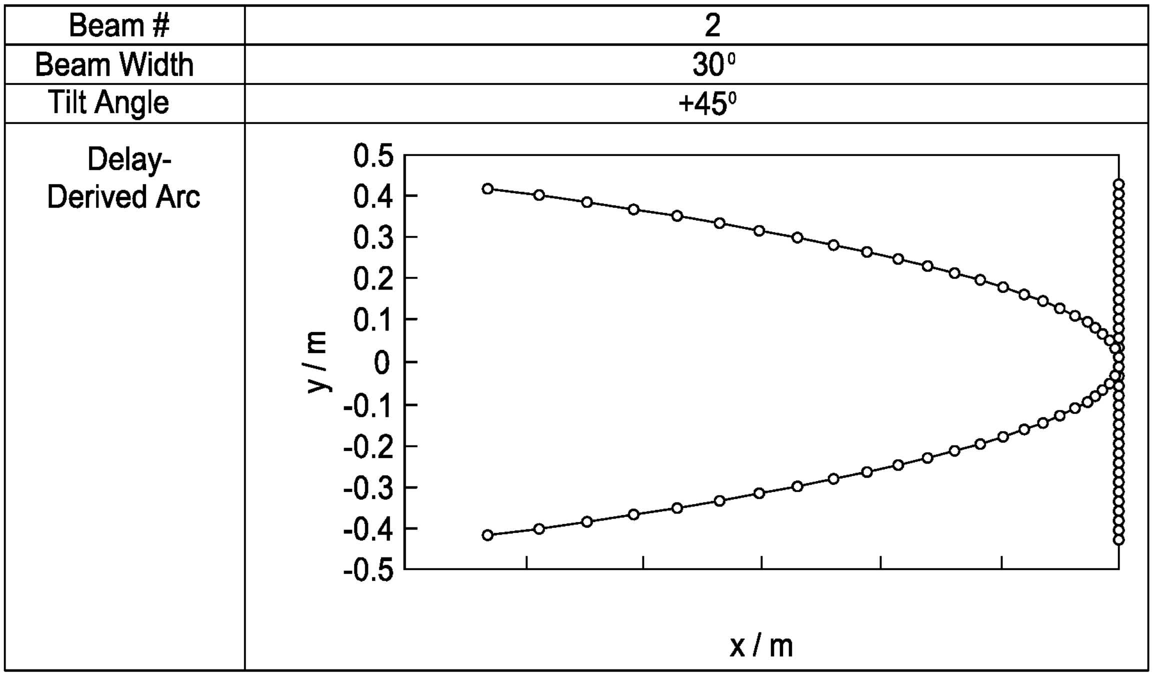
Figure 32D:
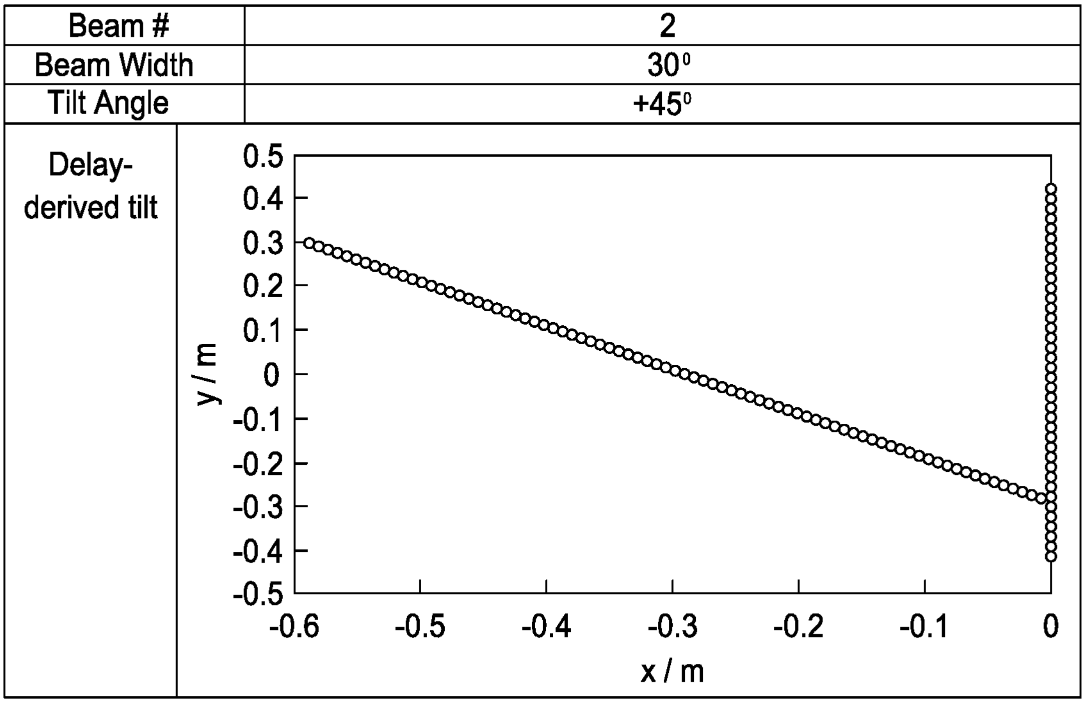
Figure 32E:
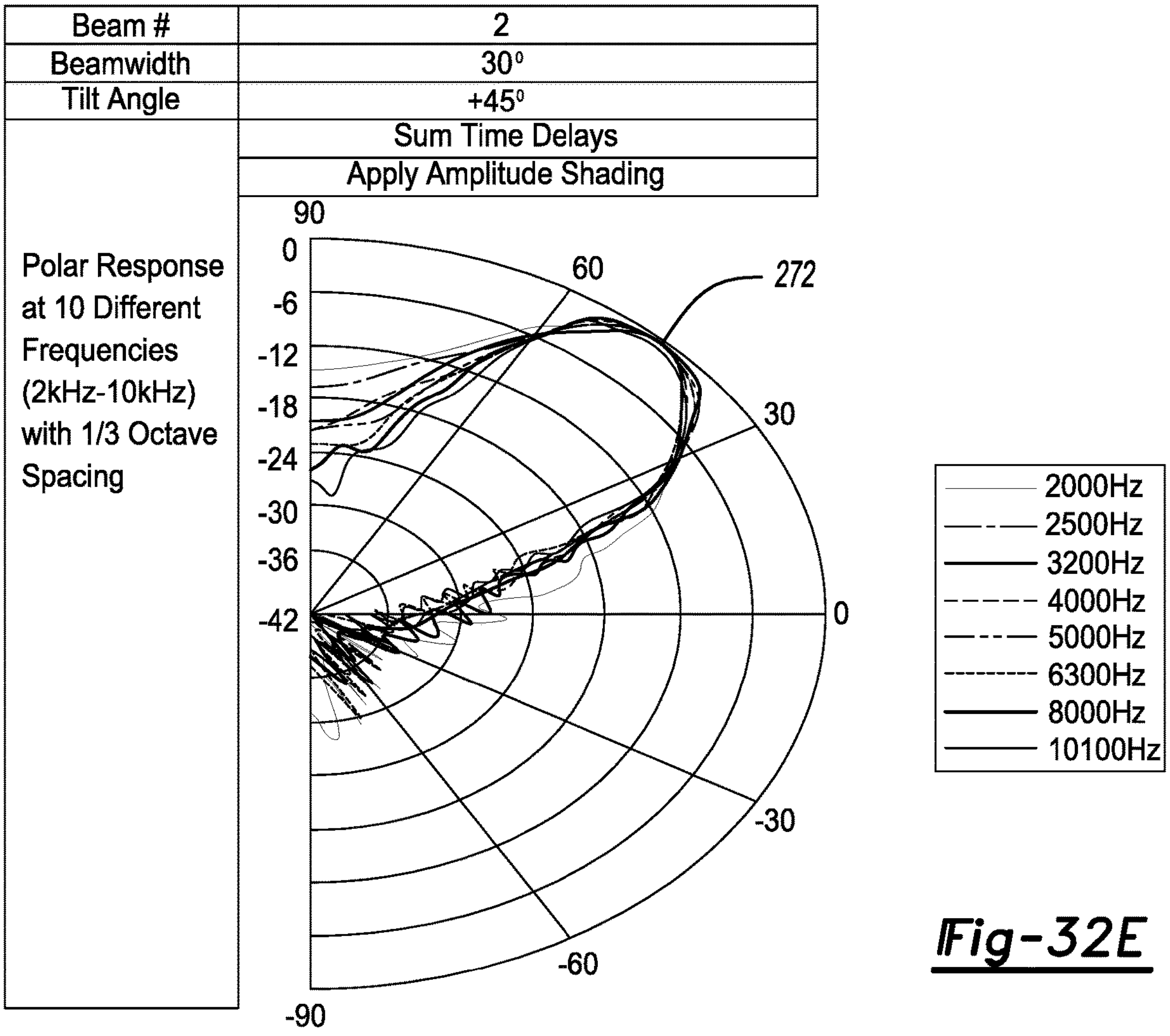
Figure 32F:
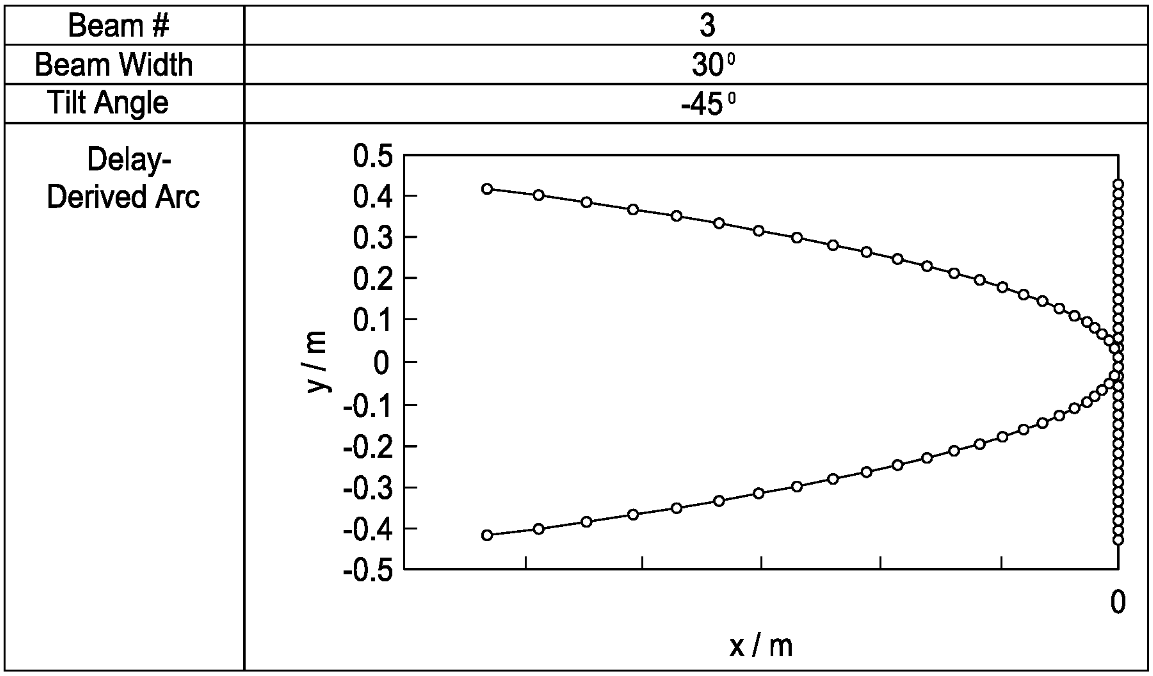
Figure 32G:
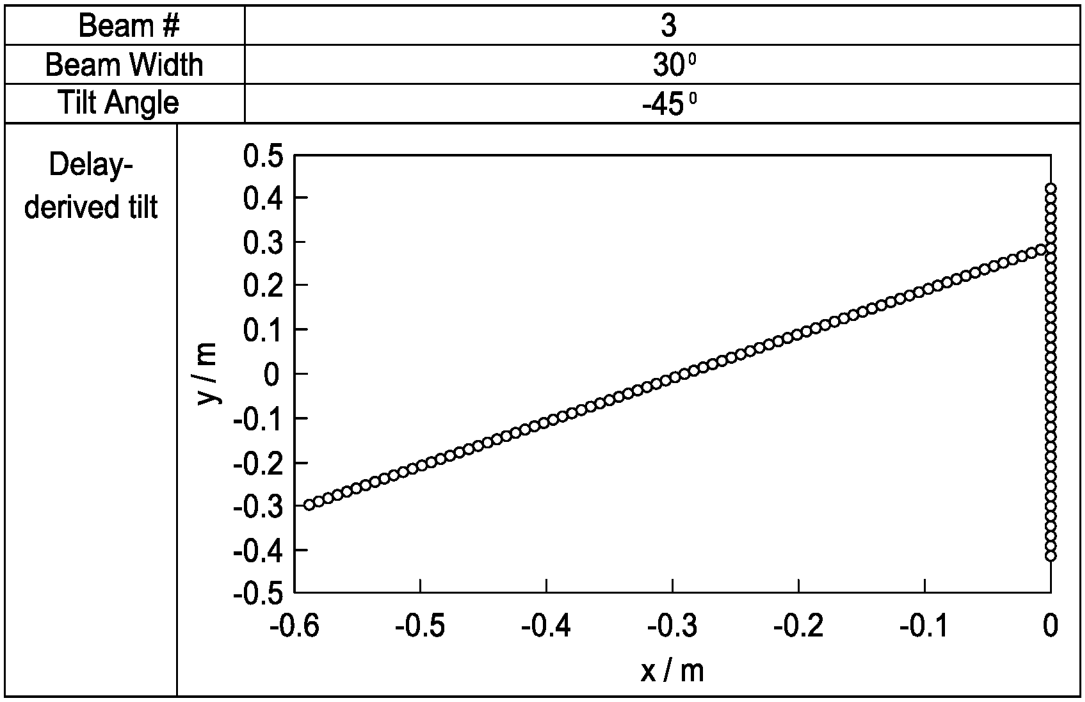
Figure 32H:
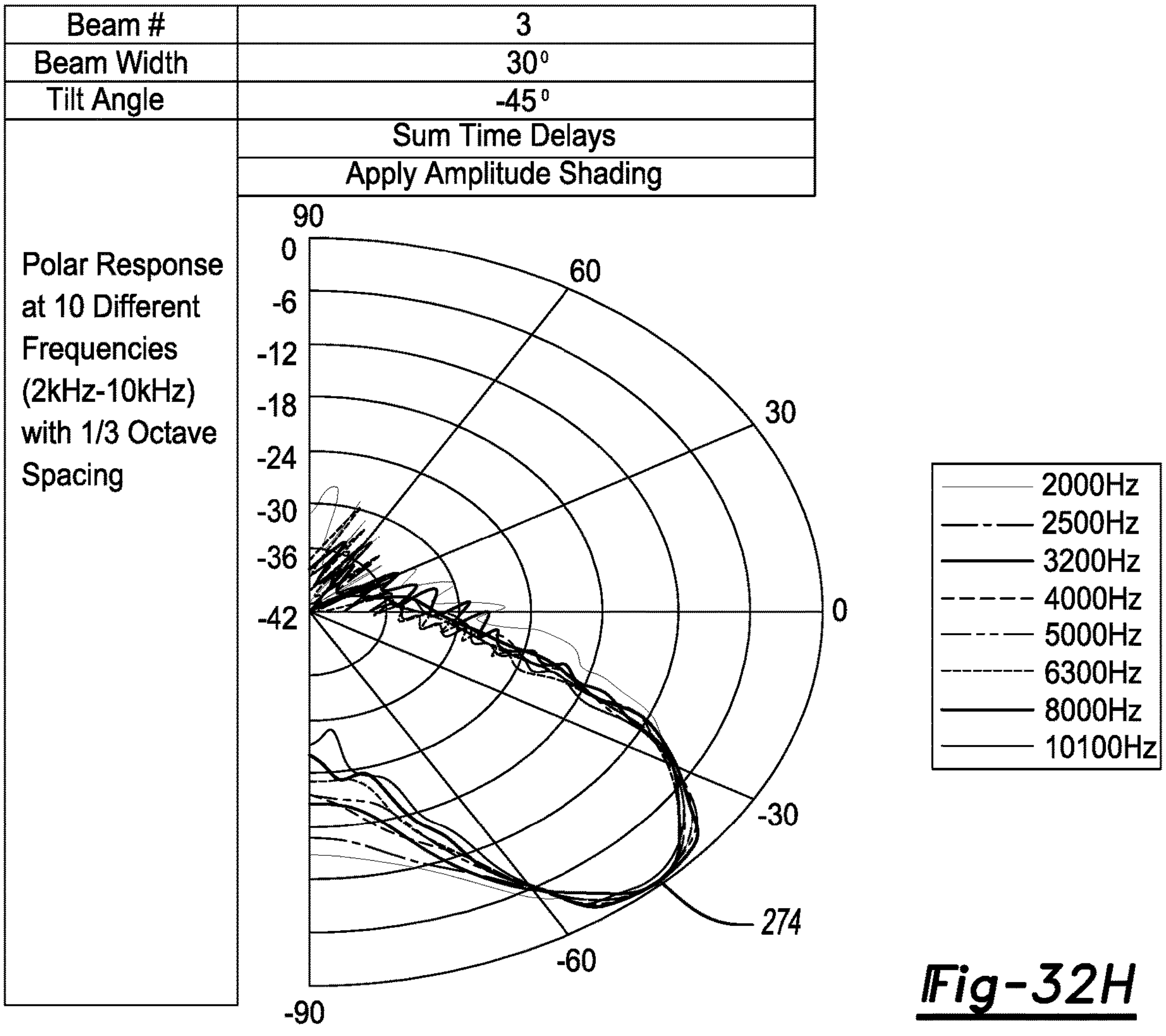
Figure 33:
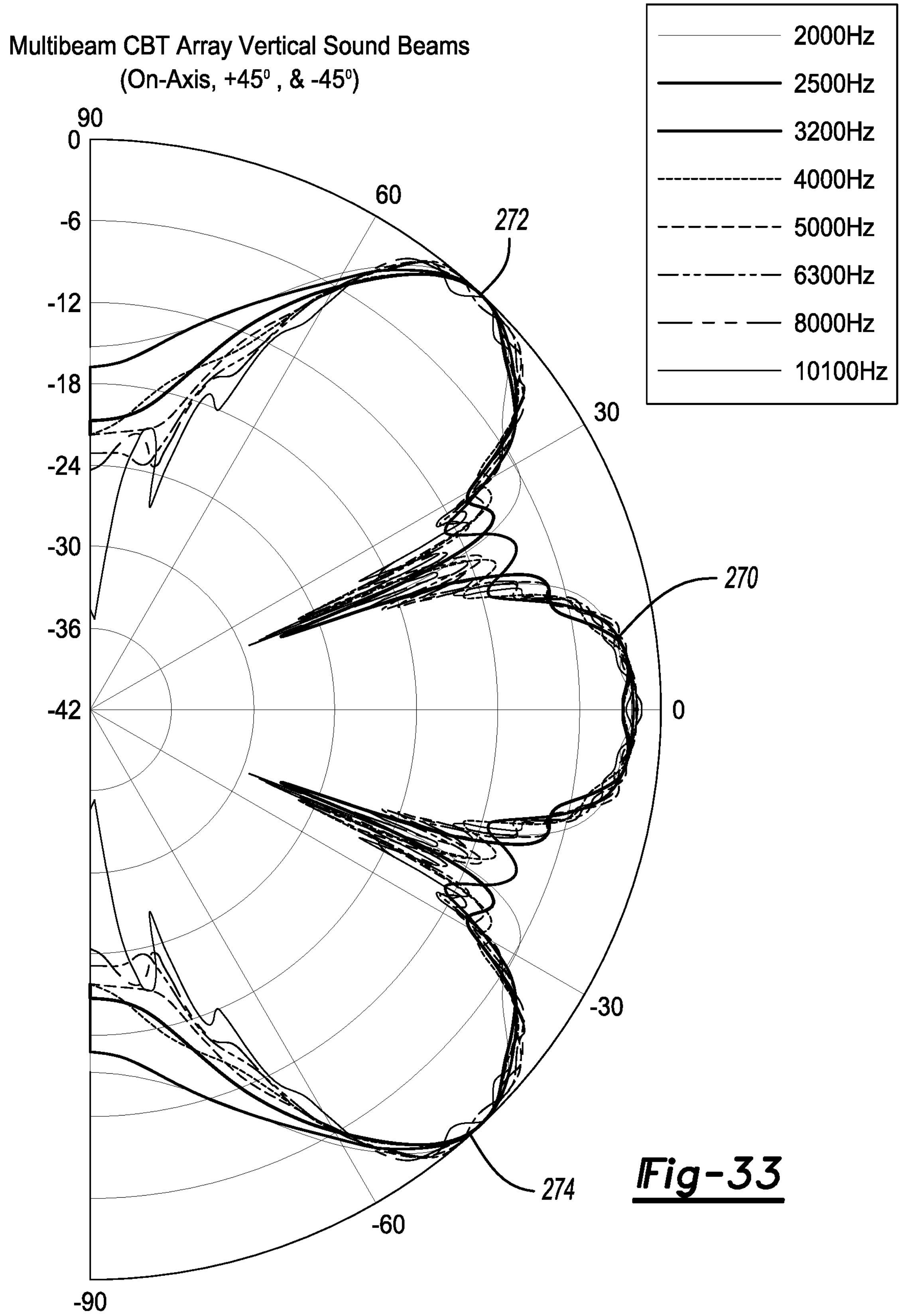
FIG. 33 generally depicts a superposition of three different vertical beams that are steered at different angles in accordance to one embodiment.

In operation 314, the separate sound beam designs 270, 272, 274 may be combined into a multi-beam response through superposition. For example, superposing beams 270, 272, and 274 as illustrated in FIGS. 32B, 32E, and 32H produce the polar response as illustrated in FIG. 33. FIG. 33 generally depicts that multiple constant beamwidth sound beams may be generated from a single straight-line array 250.

Embodiments disclosed herein generally provide a sound beam that may be steered at off-axis angles, that more than one controlled sound beam may be emitted at a time, and that each sound beam's beamwidth and polar response may be referenced from the front of the array 250 instead of the center of curvature of an arc of the array 250. The controller 202 may store information corresponding to the beams 270, 272, and 274 and control the array 250 (i.e., the drivers 252) to generate the constant sound beams 270, 272, and 274 that can be steered at off-axis angles while at the same time transmit more than one sound beam 270, 272, 274 at a time after the method 300 is fully executed.

System and Method for Dynamic Beam-Steering Controller for CBT Arrays for Surround and Overhead Sound Aspects disclosed herein also provide for a control mechanism to dynamically steer direct and reflected sound beams from CBT arrays 250 towards the listening position. For example, the disclosed examples may enable a real-time dynamic adjustment of immersive sound for various locations (e.g., sweet spots) via overhead sound (e.g., for Dolby Atmos®) as well as surround sound projection. As noted above, the system 200 provides for a steerable multi-beam CBT array 250 that is configured to generate controlled sound beams that may be pointed in different off-axis directions (see FIGS. 32B, 32E, and 32H (e.g., sound beams 270, 272, 274)). In addition, these individually steered beams 270, 272, 274 may be combined to simultaneously generate multiple beams from the same array of multiple drivers 252 (see FIG. 33).

As further noted above, the sound beams 270, 272, 274 may be formed vertically or horizontally based on the manner in which the array 250 is oriented (see FIG. 4 for the array 250 being formed vertically and FIG. 5 for the array 250 being formed horizontally). For example, a floor-standing CBT array may form sound beams vertically while a soundbar configuration (i.e. equipped with the array 250) may form sound beams horizontally.

Figure 34:
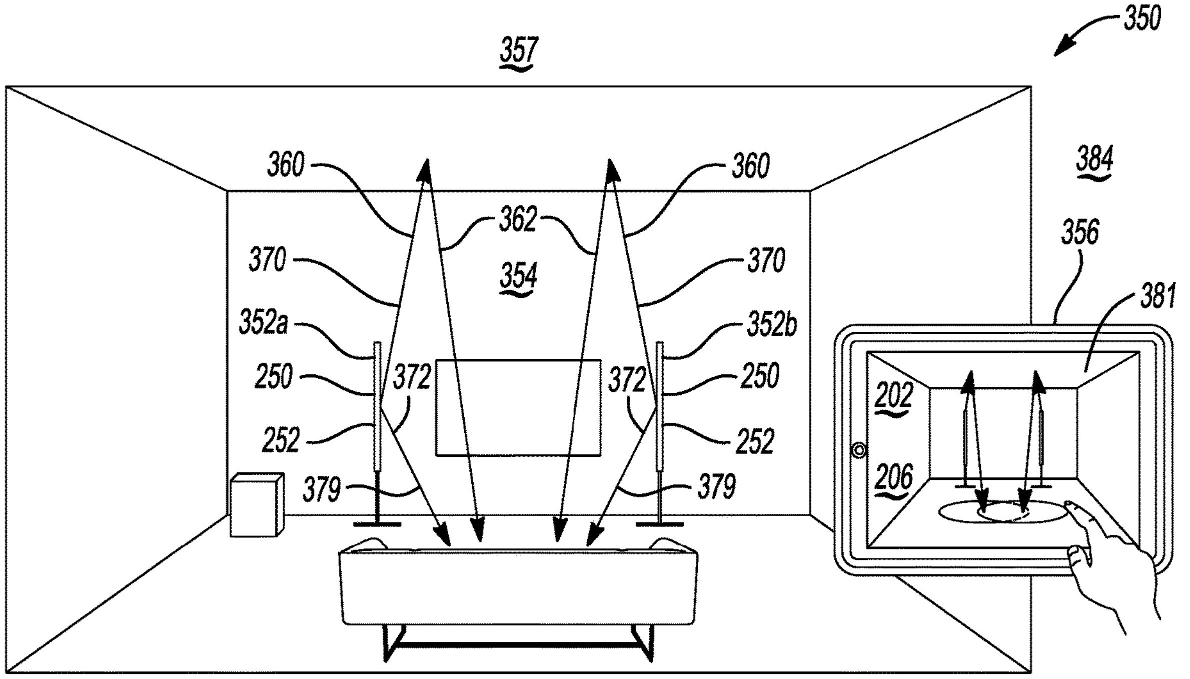
FIG. 34 generally depicts a system for adjusting a beamwidth and tilt angle for an on-axis and off-axis beam.

FIG. 34 generally depicts a system 350 for adjusting a beamwidth and tilt angle for an on-axis sound beam and an off-axis sound beam generated by the CBT array in accordance to one embodiment. The system 350 generally includes a plurality of loudspeaker assemblies 352*a*, 352*b* positioned within a listening environment 354. A mobile device 356 (e.g., cellular phone, tablet, laptop) may transmit audio input signals to the plurality of loudspeaker assemblies 352*a*, 352*b*. The plurality of loudspeaker assemblies 352*a*, 352*b* may play back audio signals in the listening environment 354 in response to audio input signals.

Each of the loudspeaker assemblies 352*a*, 352*b* may include the CBT array(s) 250 for transmitting and playing back audio signals in the listening environment. In particular, the mobile device 356 may control the transducers (or drivers) 252 of the CBT array(s) 250 to provide the steered and controlled sound beams 270, 272, 274 either on-axis or off-axis. The mobile device 356 interfaces with the audio controller 202 having the plurality of amplifiers 206 with digital signal processors that control the time delay and the amplitude shading for the transducers 252. This aspect enables the audio controller 202 to adjust the beamwidth of each sound beam generated by the transducers 252 (e.g., the loudspeaker assemblies 352*a*, 352*b*) and to further adjust the tilt angle of each sound beam generated by the transducers 252 (i.e., steer each sound beam generated by the transducers 252).

The mobile device 356 may control the loudspeaker assemblies 352*a*, 352*b* to transmit a sound beam 370 that travels about a first axis 360 (or a top-firing beam) that is orientated toward a ceiling (or upper surface) 357 in the listening environment 354. The sound beam 370 may then reflect from the ceiling 357 and travel along a second axis 362 to be consumed by listeners in the listening environment 354. The mobile device 356 may control the loudspeaker assemblies 352*a*, 352*b* to transmit a sound beam 372 that travels about a third axis 379 (or a forward-facing beam) that is orientated toward a listener(s) in the listening environment 354 for audio consumption.

In general, the audio controller 202 operates as a control mechanism in which the gain and time delay values for the transducers 252 can be dynamically calculated and updated based on at least one of the dimensions of the listening environment 354, the loudspeaker assembly location, and the listener position (or the location of the listener in the listening environment 354). By changing the gain and time delay values dynamically, the beamwidth and tilt angle of each sound beam may be optimized for a given loudspeaker setup, listening environment, and/or listener position.

The audio controller 202 may interface with both passive and active CBT arrays 250 in both curved and straight-line implementations. For a passive CBT array 250, it may not be possible to change the values of passive elements dynamically. However, a passive CBT array may include pre-built transmission line circuit configurations that provide acoustic beams at certain angle ranges (e.g., individual circuits for beams tipped at 80°, 70°, 60°, 40°, etc.). If the beam location needs to be adjusted, the circuit for the closest beam angle may be selected via the mobile device 356 to provide sound at the optimum location.

Figure 35:
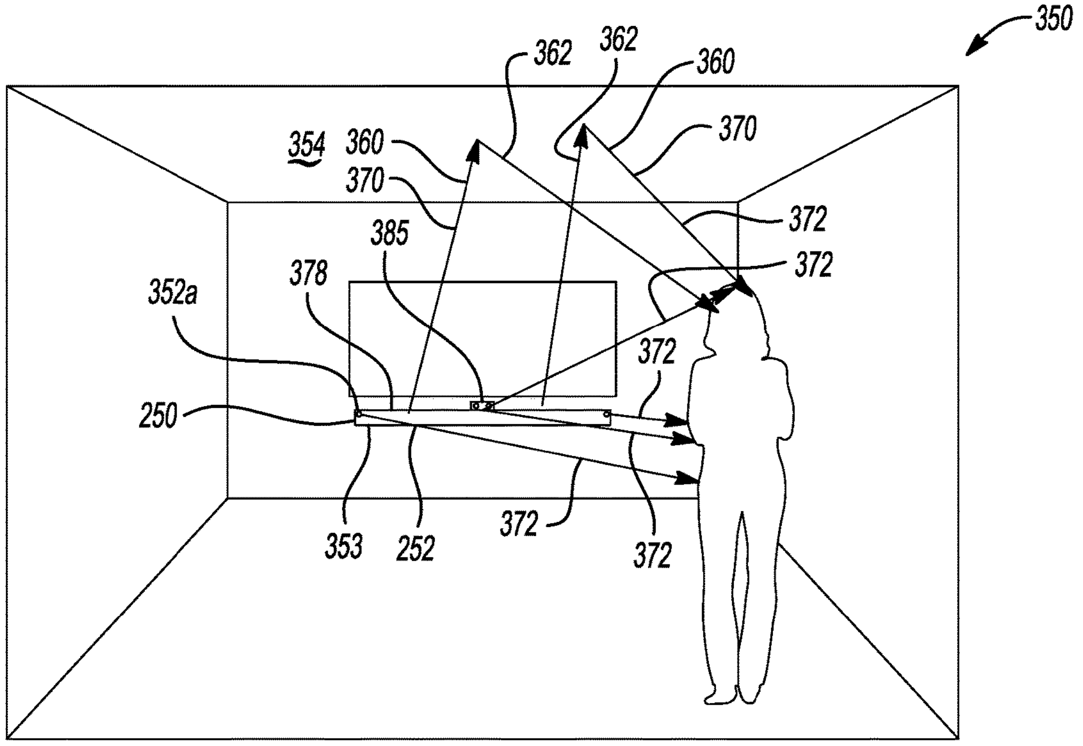
FIG. 35 generally depicts a system for determining room dimensions, a location of a loudspeaker, and a position of a listener.

The audio controller 202 may perform sound beam adjustment via any number of methods. The audio controller 202 may execute instructions to account for room dimensions (e.g., dimensions of the listening environment 354) as well as locations of loudspeaker assemblies 352*a*, 352*b* by receiving such information via a user interface 381 positioned on the mobile device 356 and/or receiving captured images via an image capture device positioned on the mobile device 356 or received at the mobile device 356 via an off-board image capture device. The audio controller 202 may interface with various sensors 384 (e.g., image and/or proximity sensors) to determine dimensions of the listening environment 354 as well as the locations of loudspeaker assemblies 352*a*, 352*b* and the position of each listener. The sensors 384 may include a mix of imaging sensors (e.g., Red, Blue, Green (RBG) camera, infra-red (IR) camera, etc.), radar, and distance-based sensors 385 as illustrated in connection with FIG. 35. For example, the distance-based sensor 385 may be installed on an enclosure 378 of any one or more of the loudspeaker assemblies 352*a*, 352*b*, and the sensor 384 may determine (or infer) room dimensions, the locations of loudspeaker assemblies 352*a*, 352*b*, and listener position automatically and provide such information to the mobile device 356. In turn, the mobile device 356 may automatically adjust the beamwidth and tilt angle to optimize overhead or surround sound for the listener. The mobile device 356 may utilize any combination of both manual inputs from the listener and information provided by sensors 384 to determine the room dimensions as well as positions for the loudspeaker assemblies 352*a*, 352*b* and the listener(s).

Figure 36:
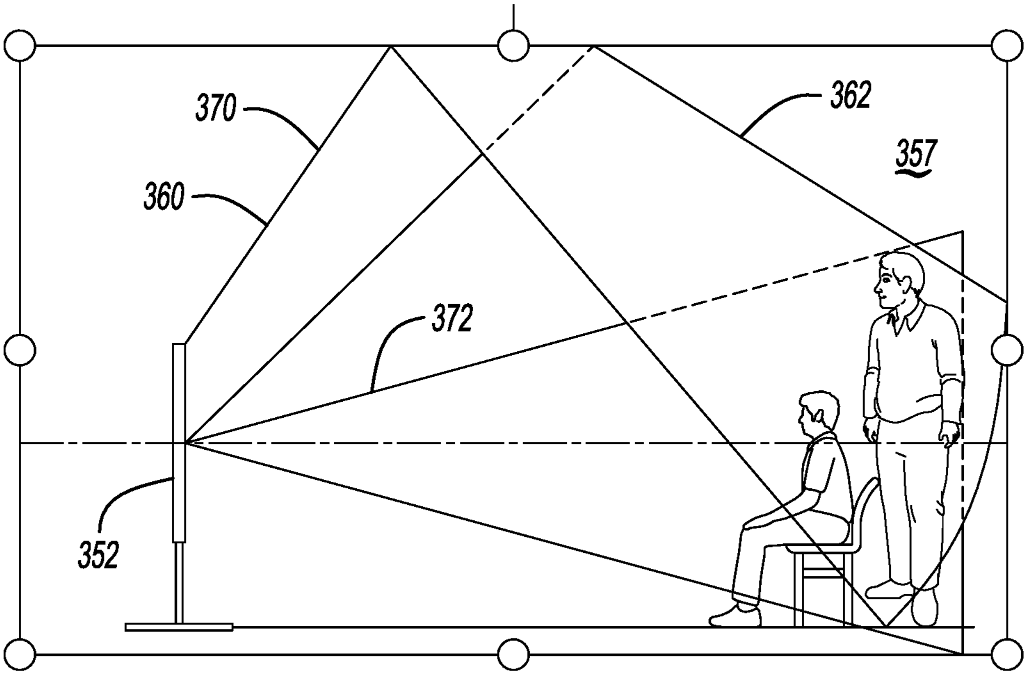
FIG. 36 generally depicts a reflected top-firing beam in a listening environment.

The mobile device 356 (e.g., the audio controller 202) may dynamically adjust the beamwidth of the sound beam and tilt angle for various use cases. One use case may involve reflecting controlled sound beams off of a ceiling 357 to create a height-enabled loudspeaker (see FIG. 36). Height-enabled loudspeakers (e.g., Dolby Atmos® enabled speakers) may create an overhead sound sensation by reflecting sound energy off of the ceiling 357 and back down towards the listener. The ceiling-reflected sound beam usually has high directivity and thus there is minimum acoustic leakage in the forward listening direction.

Figure 37:
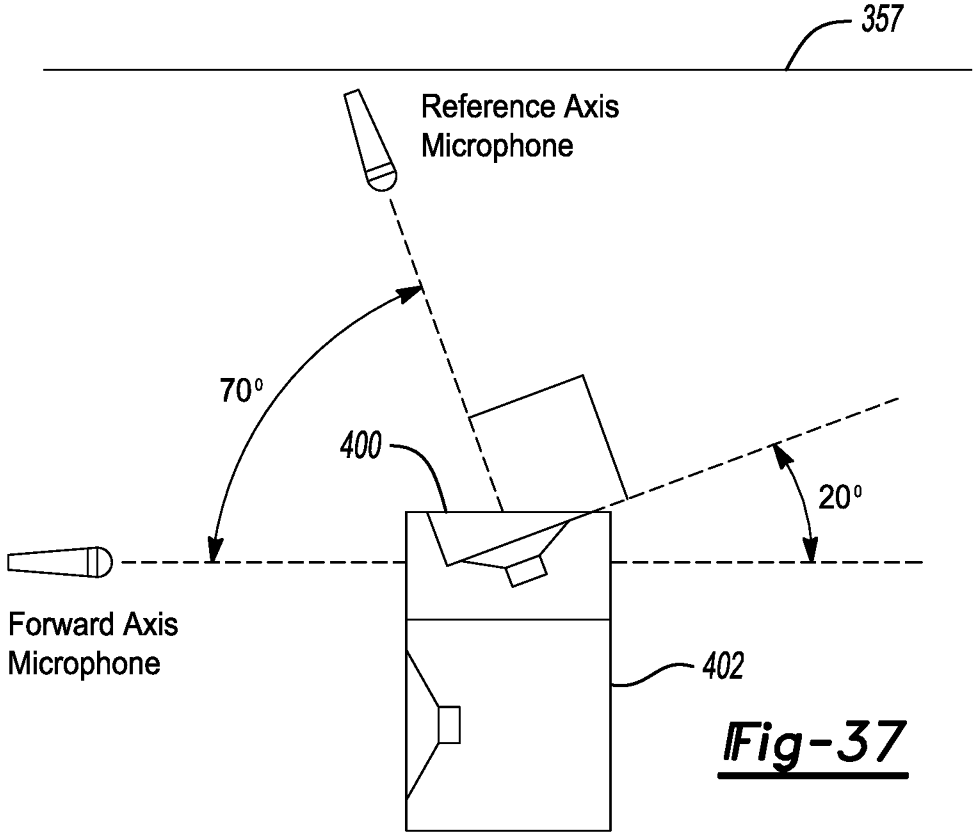
FIG. 37 generally depicts a loudspeaker driver and/or loudspeaker enclosure being angled to transmit an audio beam.
Figure 38:
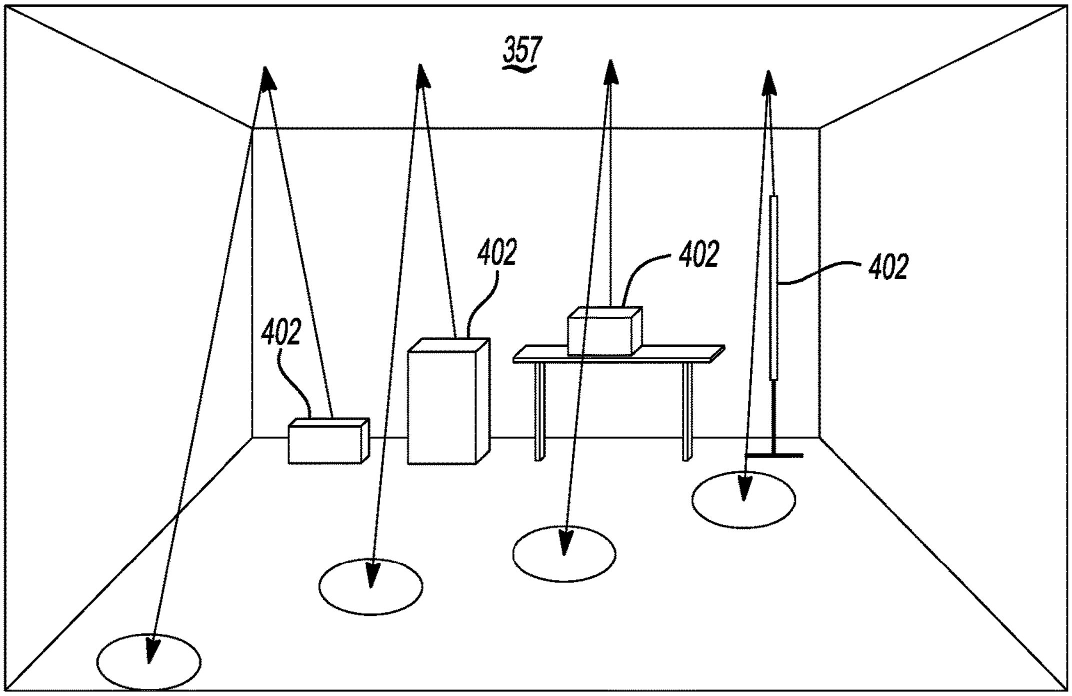
FIG. 38 generally depicts the impact of a height of a loudspeaker on a sweet spot of a reflected audio beam.
Figure 39:
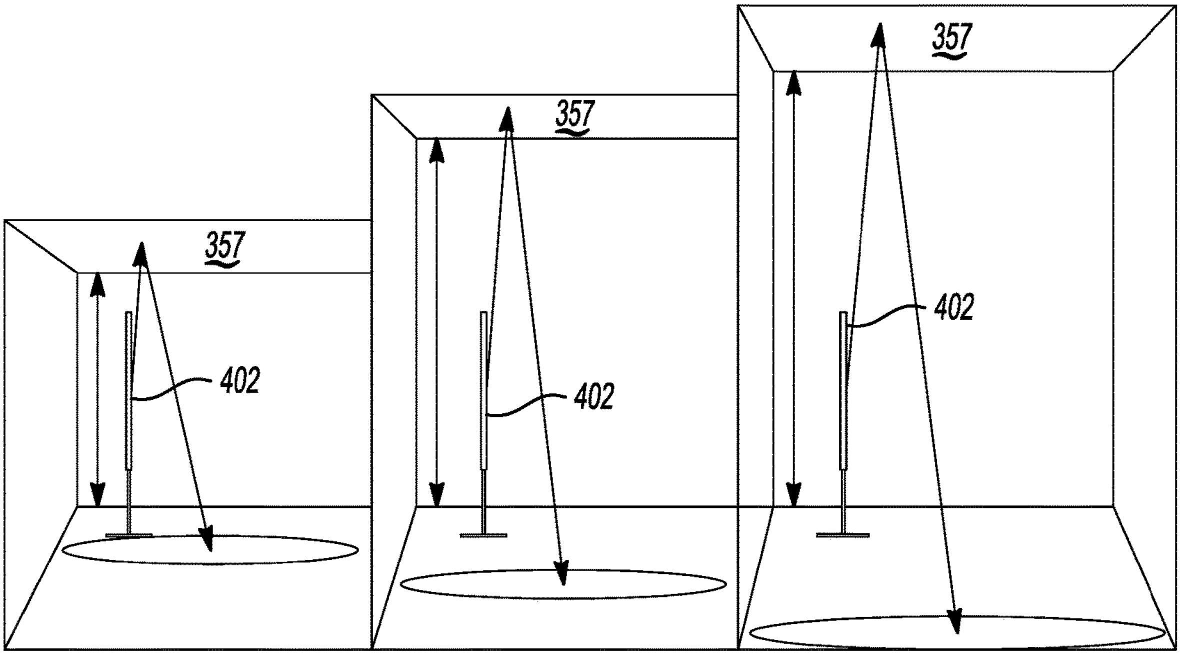
FIG. 39 generally depicts the impact of a ceiling height on a reflected sound beam and resulting sweet spot.
Figure 40:
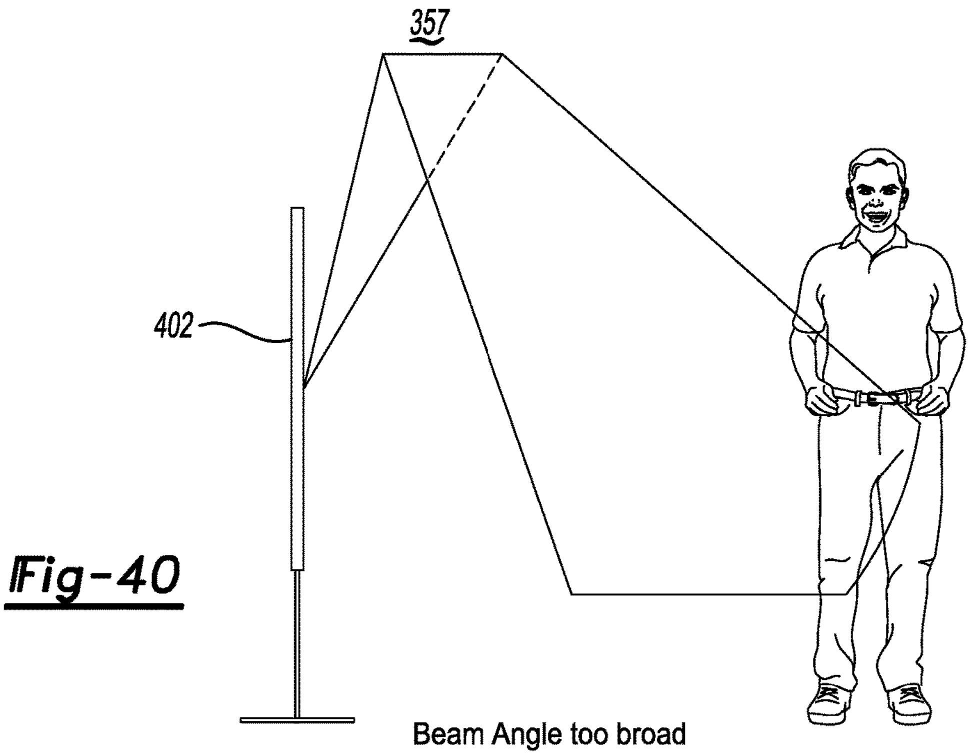
FIG. 40 generally depicts one example of an overhead sound beam.
Figure 41:
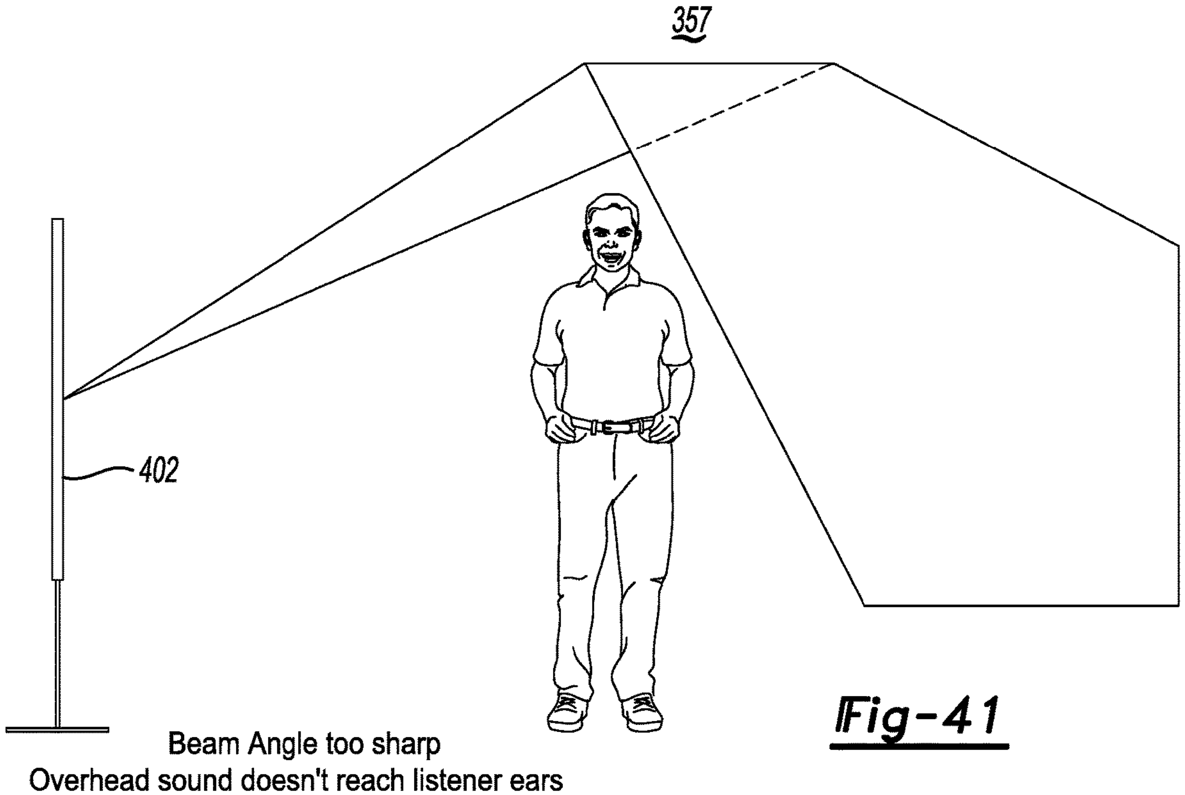
FIG. 41 generally depicts another example of an overhead sound beam.
Figure 42:
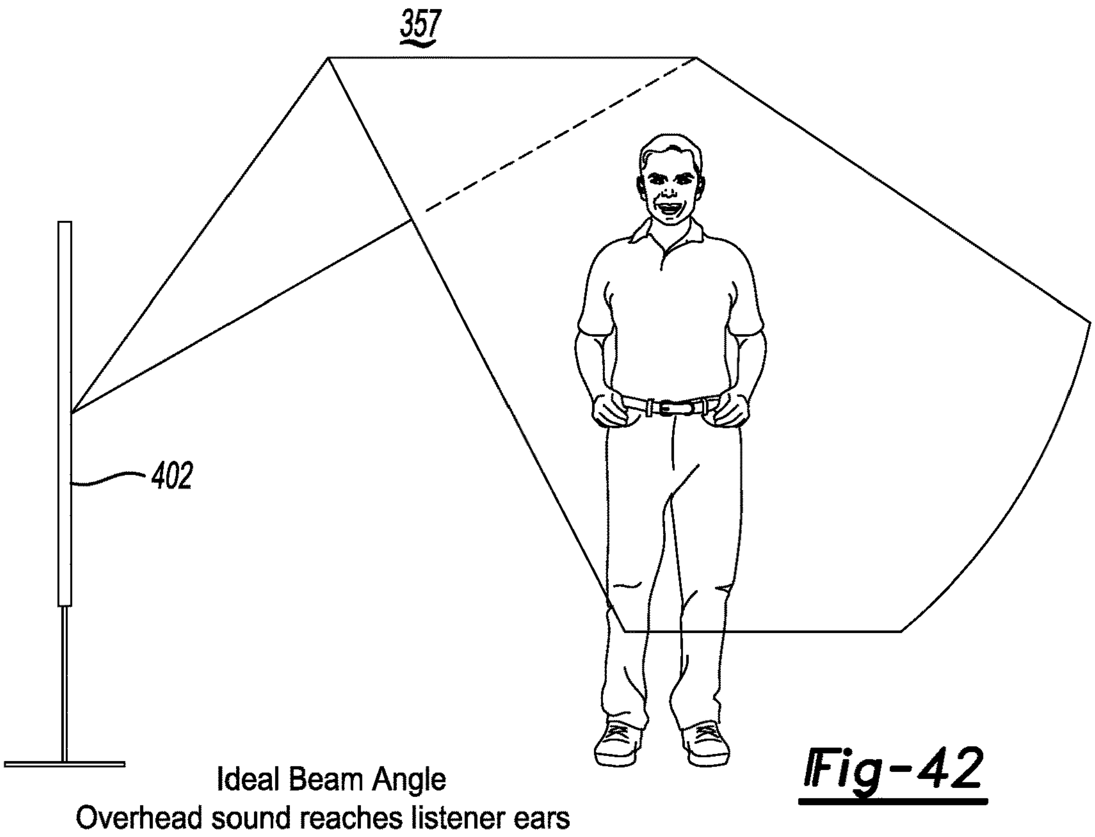
FIG. 42 generally depicts another example of an overhead sound beam.

In general, the manner in which the sound beam may be bounced or reflected off of the ceiling 357 may be performed by angling one or more drivers 400 positioned in a floor-standing loudspeaker 402 (see FIG. 37). The fixed angle of the driver 400 may cause the sweet spot for listening to vary dramatically based on the height of the loudspeaker 402 and the dimensions of the room (see FIG. 38). The higher the loudspeaker 402 is above the floor and the lower the ceiling 357, the closer the reflected sound beam will land to the loudspeaker. In contrast, the closer the loudspeaker 402 is to the floor and the higher the ceiling 357, the farther the reflected beam will land from the loudspeaker 402. Therefore, focalizing the reflecting sound beam on a specific listening position may occur if the loudspeaker 402 is precisely placed in a room with a certain ceiling height (see FIGS. 40-43). FIG. 39 generally depicts the impact of a ceiling height on a reflected sound beam and resulting sweet spot. FIG. 40 depicts the condition in which the sound beam angle is too broad due to the short ceiling 357 which causes the sound beam reflected off of the ceiling 357 to not reach the listener's ears. FIG. 41 depicts the condition in which the sound beam angle is too sharp due to a higher ceiling 357 which causes the sound beam reflected off of the ceiling 357 to pass over the listener. FIG. 42 depicts the condition in which the sound beam is transmitted from the loudspeaker 402 at an ideal angle to cause the sound beam reflected off of the ceiling 357 to reach the listener's ears. Referring back to FIG. 7, it can be seen that the width of the sound beam increases as the sound beam travels through space. Thus, the coverage angle for the sound beam at the listening position may be significantly wider than the intended sound beam based on the distance the reflected sound beam travels before reaching the listener. The embodiments as disclosed herein may resolve these noted issues. In one example, the aspects noted herein may resolve the reflected sound beam variability problems associated with fixed-angle drivers by allowing the beamwidth and tilt angle of the sound beam to be dynamically adjusted based on the location of the loudspeaker assembly 352 and the listener position. In doing so, the controlled (or angled) acoustic beam may contact the ceiling at an appropriate distance and angle such that the reflected beam from off of the ceiling 357 reaches the listener's ear level with the proper coverage angle.

Figure 43:
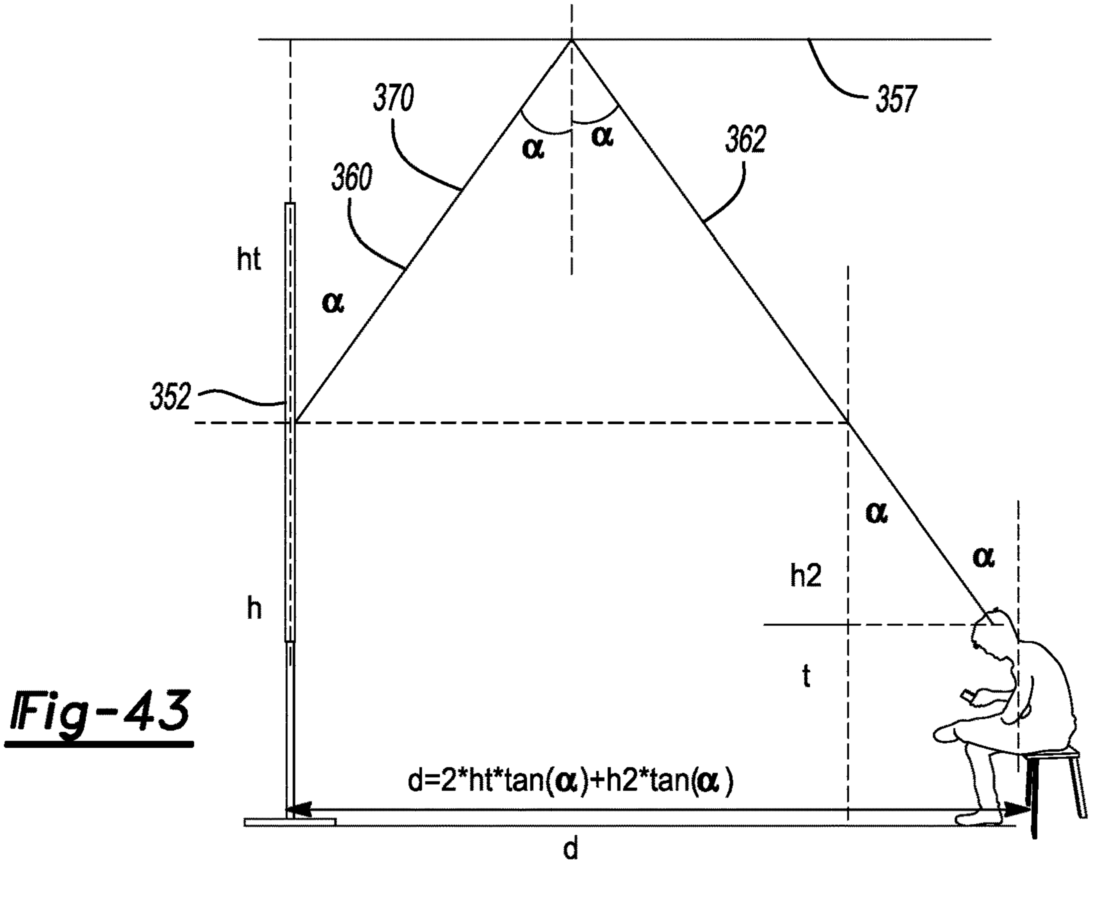
FIG. 43 generally depicts one example of a system for providing beamwidth and beam angle changes based on listener position, ceiling height, and loudspeaker height in accordance to one embodiment.

FIG. 43 generally depicts the loudspeaker assembly 352 positioned in the listening environment 354 that transmits audio at an adjusted beamwidth and tilt angle in accordance to one embodiment. As shown in FIG. 43, α corresponds to the angle of reflection off of the ceiling 357, and 90−α corresponds to the tilt angle of the loudspeaker assembly 352. With reference to FIG. 43, it is possible to calculate the tilt angle of the loudspeaker assembly 352 by the following equation, 90−α. While a corresponds to the angle of reflection off of the ceiling 357, FIG. 43 generally depicts a at other geometrically-equivalent angular locations relative to the sound beam as will be recognized by one skilled in the art in light of the present disclosure. Additionally, d corresponds to a distance between the location of the loudspeaker assembly 352 and the location of the listener. Specifically, the distance d may be found by the following equation:

$$d=2*ht*\tan(a)+h2*\tan(a)$$

where ht is a distance between the ceiling height and the height of the sound beam origin relative to the front of the loudspeaker assembly 352, and h2 is a distance between a height of the listener's ear relative to the ground or floor and a height of the sound beam origin relative to the front of the loudspeaker assembly 352. Thus, in this regard, the tilt angle may be determined by solving for this variable with the equation as set forth directly above. It is recognized that the mobile device 356 (or the audio controller 202) may determine the tilt angle of the loudspeaker assembly 352 based on the height of the ceiling, the height of the loudspeaker assembly 352, and the height of the listener's ear relative to the ground or floor. These values may be manually input into the mobile device 356, determined via an image capture device positioned on or off of the mobile device 356, and/or be inferred/determined via the sensors 384, 385.

Figure 44:
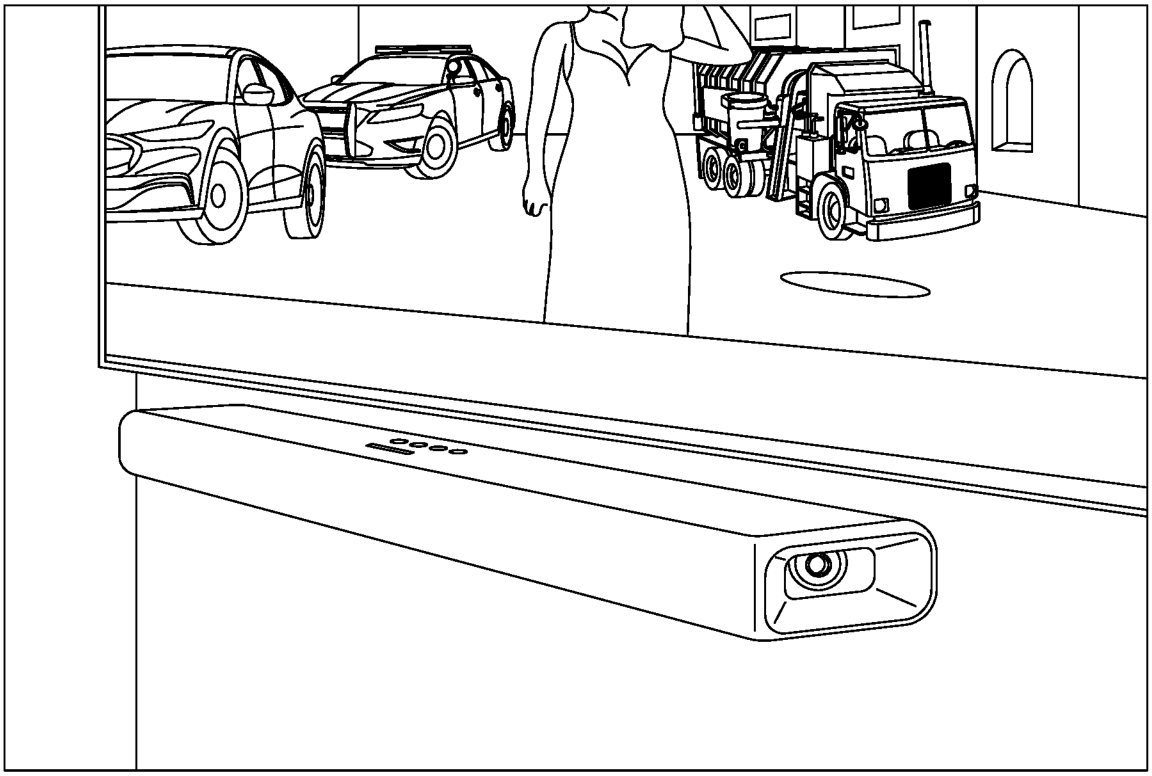
FIG. 44 generally depicts one example of angled end drivers.

In general, similar to height-enabled loudspeakers, virtual surround sound loudspeakers may create a sense of surround sound by reflecting sound energy off of sidewalls and a back wall toward the listener. This may be accomplished by angling one or more drivers in a floor-standing loudspeaker or soundbar to point out toward the sidewalls as generally shown in FIG. 44. For example, the loudspeaker assembly as illustrated in FIG. 44 is a soundbar that includes angled end drivers to reflect sound off of both sidewalls to create a virtual surround effect.

Virtual-surround loudspeakers with fixed-angle drivers exhibit similar beamwidth and tilt angle variability problems based on the locations of the loudspeaker and the room dimensions, as previously discussed with their height-enabled counterparts. However, instead of the ceiling height being problematic as discussed in connection with height-enabled loudspeaker assemblies, the critical dimension for the reflected beam in virtual surround sound loudspeaker assemblies is the distance and angle between the loudspeaker assembly and the sidewall. Therefore, the loudspeaker assembly 352 (e.g., the CBT array 250 and corresponding drivers 252) may be used for the virtual-surround loudspeaker use case. In this instance, the mobile device 356 (or the audio controller 202) may compute and update the beamwidth and tilt angle of the sound beam such that the reflected beam will reflect off of the sidewalls and reach the listener's position with the proper coverage angle. Since the CBT array 250 can generate multiple beams from a single array, custom beamwidths and tilt angles may be dynamically created for the left and right sidewall reflection separately.

Figure 45:
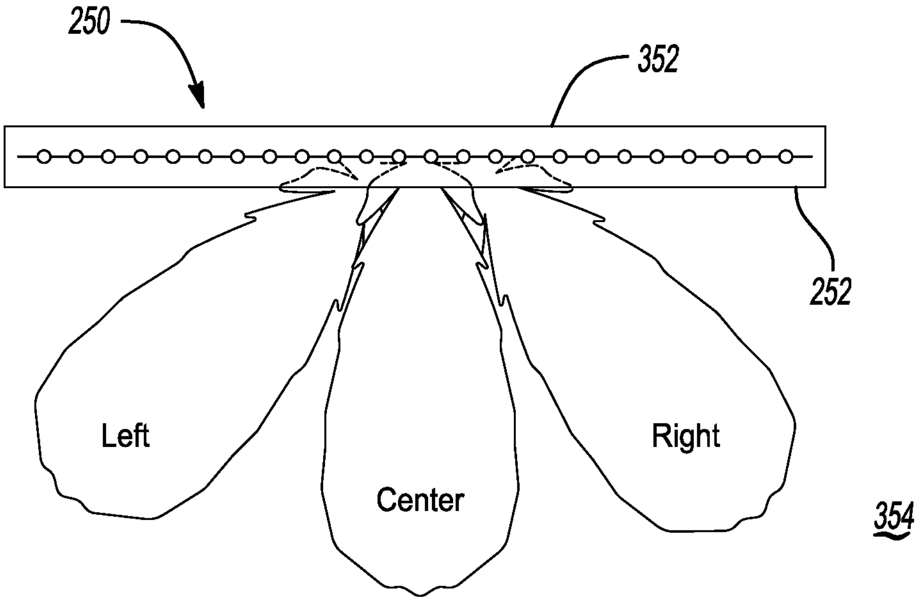
FIG. 45 generally depicts one example of a CBT array with separate left, right and center channels.

Rather than using left driver(s) for a left channel, right driver(s) for a right channel, and center driver(s) for a center channel as is typically done in commercially-available soundbars, it is recognized that a soundbar may utilize the CBT array 250 as disclosed herein to form separate sound beams for the left, center, and right channels by utilizing all drivers 252 in tandem as illustrated in FIG. 45. For example, the drivers 252 of the CBT array 250 may simultaneously or concurrently transmit three separate beams (e.g., left beam, center beam, and right beam) into the listening environment 354.

In addition to each of these channel beams exhibiting constant beamwidth over a wide bandwidth (which is not the case for typical L (Left), C (Center), R (Right) (or "LCR") soundbar configurations), the beamwidth and tilt angle of each channel beam may be dynamically changed based on the location of the loudspeaker, position of the listener, and the room dimensions. In general, the audio controller 202 may control the drivers 252 of the CBT array 250 to dynamically adjust each driver's time delay or gain either automatically or manually.

It is possible to create personalized sound beams for individual listeners in a room (or listening environment) and dynamically adjust the sound beam as each listener changes position. The loudspeaker assembly 352 with the CBT array 250 along with the audio controller 202 facilitates the ability to generate personalized sound beams for multiple listeners from a single CBT array.

As discussed above, the audio controller 202 and the CBT array 250 may solve the problem of listening sweet spot variability depending on the loudspeaker position and room dimensions by dynamically optimizing the beam angle and beamwidth of acoustic beams to the listening position(s). This solution may overcome the shortcomings of height-enabled and virtual-surround loudspeakers that are currently on the market that reflect acoustic beams at fixed angles off the ceiling and sidewalls to create overhead and surround sound sensations, respectively. Since both the angle and width of the reflected beam are fixed, there is no control over the listening sweet spot. Instead, the position of the loudspeaker assembly and room dimensions dictate the location and coverage angle of the reflected acoustic beam. If the position of the loudspeaker assembly changes, so will the sweet spot for listening. For example, Dolby Atmos® is a surround sound technology developed by Dolby Laboratories that specifics a standard for overhead sound through height channels. The standard requires that a forward-facing loudspeaker direct a significant amount of acoustic energy 70° to 90° from the front (towards the ceiling) so that the reflected beam lands at the listening position. This one-size-fits-all-approach is generally applicable to box loudspeakers and may not work with loudspeaker assemblies with different form factors, such as tower or column loudspeakers (due to their tall height). It also assumes standardized room dimensions and therefore, may not provide the optimal listening experience at the listening position depending on the location of the loudspeaker and the size of the room.

In addition, the audio controller 202 and the CBT array 250 provide more control over the stereo sound field than typical LCR speakers housed in a single unit by forming individual beams for different audio channels, such as Left, Center, and Right. For example, most LCR soundbars assign the left, center, and right channels to separate drivers (or sets of drivers). In doing so, the beamwidth and angle of the left, center, and right channel beams are limited by the directivity and coverage pattern of the corresponding drivers (or sets of drivers). However, the audio controller 202 and the CBT array 250 enable dynamic reconfiguration of the beamwidth and angle of each channel beam separately, providing more control over the resulting stereo field. Furthermore, since the CBT array 250 generates constant beams over a wide bandwidth, the stereo field will be more consistent over more of the audible spectrum. By contrast, typical LCR soundbars generate increasingly narrow beams at higher frequencies as the wavelength of sound becomes comparable to the size of the driver(s).

Lastly, the audio controller 202 and the CBT array 250 may overcome the limitations of non-constant beamwidth loudspeaker solutions in forming personalized beams for individual listeners in a room and adjusting the beams as each listener changes position. By tailoring the beamwidth and angle of each beam to its respective listener, the audio controller 202 prevents personalized beams from bleeding into and overlapping each other. Even if a non-constant beamwidth loudspeaker has a mechanism for directing individual beams at specific listeners, the coverage angles of those beams will vary with frequency and may interfere with each other.

Figure 46:
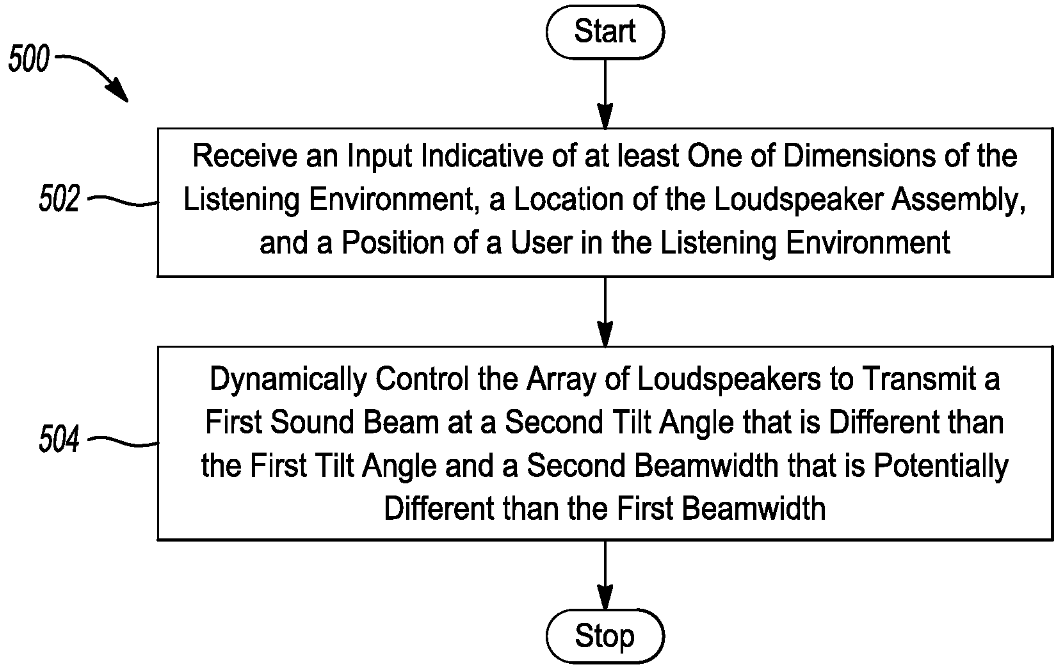
FIG. 46 generally depicts a method for automatically adjusting a beamwidth and/or tilt angle of the sound beam from the loudspeaker assembly, including the CBT array of transducers that transmits a sound beam at a first tilt angle into a listening environment in accordance to one embodiment.

FIG. 46 depicts a method 500 for automatically adjusting the beamwidth and/or tilt angle of a sound beam from the loudspeaker assembly 352 including the CBT array of transducers 252 that transmits a sound beam at a first tilt angle into a listening environment 354 in accordance to one embodiment. The operations as set forth below may be executed by the system 350 as set forth above.

In operation 502, the audio controller 202 receives an input that is indicative of at least one of the dimensions of the listening environment 354, the location of one or more of the loudspeaker assemblies 352 as positioned in the listening environment 354, and the position of at least one user (or listener) in the listening environment 354. In one example, the user may enter values via the user interface 381 to transmit to the audio controller 202 at least one of the dimensions of the listening environment 354, the location of one or more of the loudspeaker assemblies 352 as positioned in the listening environment 354, and the position (or location) of at least one user (or listener) in the listening environment 354.

As noted above, the sensors 384 may comprise various distance sensors that provide the input corresponding to at least one of the dimensions of the listening environment 354, the location of one or more of the loudspeaker assemblies 352 as positioned in the listening environment 354, and the position of at least one user (or listener) in the listening environment 354. The distance sensors (or proximity sensors) generally output a laser, infrared (IR), light emitting device (LED), or ultrasonic signal that is read after such a signal is returned and received back at the distance sensor to determine the manner in which such signals have changed. The change may involve a variation in the intensity of the laser, LED, or ultrasonic signal and/or the amount of time it takes for the signals to return back to the distance sensor after the distance sensor transmits the original signal in the listening environment 354.

The audio controller 202 may also receive the input as captured images from the image capture device. In one example, the audio controller 202 (or other suitable controller or processor) may perform various learning algorithms or may be trained via clustering groups of data points to ascertain the dimensions of the listening environment 354, the location of one or more of the loudspeaker assemblies 352 as positioned in the listening environment 354, and the location of a user (or listener) in the listening environment 354.

In operation 504, the audio controller 202 dynamically controls the CBT array 250 to change the first tilt angle to a second tilt angle for transmitting the sound beam into the listening environment 354 based on the input. For example, the audio controller 202 dynamically controls the array 250 to transmit the sound beam at the second tilt angle by adjusting a time delay of one or more of the transducers (drivers) 252 of array 250 in response to the input.

The audio controller 202 may dynamically control the array 250 of transducers 252 to transmit the sound beam at a second beamwidth that is the same as or different than the first beamwidth into the listening environment 354 based on the input. For example, the audio controller 202 dynamically controls the array 250 to transmit the sound beam at the second beamwidth by adjusting the time delay and the gain of one or more of the transducers 252 in response to the input.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system for controlling a multi-beam constant beamwidth transducer (CBT) array, the system comprising:

a loudspeaker assembly including a constant beamwidth transducer (CBT) array of transducers configured to transmit a first sound beam at a first tilt angle into a listening environment;

at least one controller programmed to:

receive an input indicative of at least one of dimensions of the listening environment, a location of the loudspeaker assembly, and a location of at least one user in the listening environment; and dynamically control the CBT array of transducers to transmit the first sound beam at a second tilt angle that is different than the first tilt angle into the listening environment based on the input, wherein the input corresponds to at least a captured image of the dimensions of the listening environment.

2. The system of claim 1, wherein the at least one controller is further programmed to dynamically control the CBT array of transducers to transmit the first sound beam at the second tilt angle by adjusting a time delay of one or more of the CBT array of transducers as the CBT array of transducers transmits the first sound beam based on the input.

3. The system of claim 1, wherein the CBT array of transducers is further configured to transmit the first sound beam at the first tilt angle and at a first beamwidth into the listening environment.

4. The system of claim 3, wherein the at least one controller is further programmed to dynamically control the CBT array of transducers to transmit the first sound beam at a second beamwidth that is one of the same as the first beamwidth or different than the first beamwidth into the listening environment based on the input.

5. The system of claim 4, wherein the at least one controller is further programmed to dynamically control the CBT array of transducers to transmit the first sound beam at the second beamwidth by adjusting a time delay and a gain of one or more of the transducers of the CBT array of transducers based on the input.

6. The system of claim 1, wherein the input is provided via a user interface.

7. The system of claim 1, wherein the input further corresponds to the location of the loudspeaker assembly and the location of at least one user in the listening environment.

8. The system of claim 1, wherein the CBT array of transducers extends along a first planar axis and wherein the CBT array of transducers is virtually rotated while transmitting the first sound beam based on a time delay.

9. The system of claim 8, wherein one or more transducers of the CBT array of transducers is virtually rotated based on a time delay, where the time delay is based on a distance to move the one or more transducers from an original position to a first position and on a constant value.

10. A system for controlling a multi-beam constant beamwidth transducer (CBT) array, the system comprising:

a loudspeaker assembly including a constant beamwidth transducer (CBT) array of transducers configured to transmit a first sound beam at a first beamwidth into a listening environment;

at least one controller programmed to:

receive an input indicative of at least one of dimensions of the listening environment, a location of the loudspeaker assembly, and a location of at least one user in the listening environment; and dynamically control the CBT array of transducers to transmit the first sound beam at a second beamwidth that is different than the first beamwidth into the listening environment based on the input, wherein the input corresponds to at least a captured image of the dimensions of the listening environment.

11. The system of claim 10, wherein the at least one controller is further programmed to dynamically control the CBT array of transducers to transmit the first sound beam at the second beamwidth by adjusting a time delay and a gain of one or more of the transducers of the CBT array of transducers based on the input.

12. The system of claim 10, wherein the CBT array of transducers is further configured to transmit the first sound beam at a first tilt angle and at the first beamwidth into the listening environment.

13. The system of claim 12, wherein the at least one controller is further programmed to dynamically control the CBT array of transducers to transmit the first sound beam at a second tilt angle that is different than the first tilt angle into the listening environment based on the input.

14. The system of claim 13, wherein the at least one controller is further programmed to dynamically control the CBT array of transducers to transmit the first sound beam at the second tilt angle by adjusting a time delay of one or more transducers of the CBT array of transducers.

15. The system of claim 10, wherein the input is provided via a user interface.

16. The system of claim 10, wherein the CBT array of transducers extends along a first planar axis and wherein the CBT array of transducers is virtually rotated while transmitting the first sound beam.

17. The system of claim 16, wherein one or more transducers of the CBT array of transducers is virtually rotated based on a time delay, where the time delay is based on a distance to move the one or more transducers from an original position to a first position and on a constant value.

18. A method for controlling a multi-beam constant beamwidth transducer (CBT) array, the method comprising:

receiving an input indicative of at least one of dimensions of a listening environment, a location of a loudspeaker assembly, and a location of at least one user in the listening environment, the loudspeaker assembly including a constant beamwidth transducer (CBT) array of transducers that transmits a first sound beam at a first tilt angle and at a first beamwidth into a listening environment; and dynamically controlling the CBT array of transducers to transmit the first sound beam at a second tilt angle that is different than the first tilt angle and at a second width that is one of the same as or different than the first beamwidth into the listening environment based on the input, wherein the input corresponds to at least a captured image of the dimensions of the listening environment.

19. The method of claim 18 further comprising dynamically controlling the CBT array of transducers to transmit the first sound beam at the first beamwidth by adjusting a time delay and a gain of one or more transducers of the CBT array of transducers based on the input.

20. The method of claim 18 further comprising dynamically controlling the CBT array of transducers to transmit the first sound beam at the second tilt angle by adjusting a time delay of one or more transducers of the CBT array of transducers based on the input.

* * * * *